(12) United States Patent
Fant

(10) Patent No.: US 8,020,145 B2
(45) Date of Patent: Sep. 13, 2011

(54) METHOD AND LANGUAGE FOR PROCESS EXPRESSION

(75) Inventor: Karl M. Fant, Mountain View, CA (US)

(73) Assignee: Wave Semiconductor, San Jose, CA (US)

(*) Notice: Subject to any disclaimer, the term of this patent is extended or adjusted under 35 U.S.C. 154(b) by 1159 days.

(21) Appl. No.: 11/504,711

(22) Filed: Aug. 16, 2006

(65) Prior Publication Data

US 2007/0044074 A1  Feb. 22, 2007

Related U.S. Application Data

(60) Provisional application No. 60/709,093, filed on Aug. 18, 2005.

(51) Int. Cl.
*G06F 9/44* (2006.01)
(52) U.S. Cl. ........................................... 717/114
(58) Field of Classification Search ................... 717/114
See application file for complete search history.

(56) References Cited

U.S. PATENT DOCUMENTS

| 4,814,978 A | 3/1989 | Dennis |
| 5,805,461 A | 9/1998 | Fant |
| 6,327,607 B1 | 12/2001 | Fant |

OTHER PUBLICATIONS

Sima et al., *Advanced Computer Architectures: A Design Space Approach*, 1997, Addison Wesley Longman Limited.
Fountain, T.J., *Parallel Computing: Principles and Practice*, 1994, Cambridge University Press.
Schneider, Fred B., *On Concurrent Programming*, 1997, Springer-Verlag New York.
Culler et al., *Parallel Computer Architecture: A Hardware/Software Approach*, 1999, Morgan Kaufman Publishers.
Hwang et al., *Computer Architecture and Parallel Processing*, 1984, McGraw-Hill.
El-Rewini et al., *Distributed and Parallel Computing*, 1998, Manning Publications Co.
Dershem et al., *Programming Languages: Structures and Models*, 1990, Wadsworth Publishing Co.
Friedman et al., *Essentials of Programming Languages*, 1992, Massachusetts Institute of Technology.
Papadopoulos et al., "Monsoon: an Explicit Token-Store Architecture," ISCA 1990, pp. 82-91.
Sakai et al., "Prototype Implementation of a Highly Parallel Dataflow Machine EM-4," Proc. of the Fifth International Parallel Processing Symposium, Apr. 1991, pp. 278-286.
Shimada et al., "Evaluation of a Prototype Data Flow Processor of the Sigma-1 for Scientific Computations," Proceedings of the 13th Annual Symposium on Computer Architecture, Jun. 1986, Tokyo, Japan, pp. 226-234.
Soley, "A Third Opinion on Data Flow Machines and Languages," Computation Structures Group Memo 241, MIT Laboratory for Computer Science, Oct. 10, 1984.
Iannucci, "Toward a Dataflow/Von Neumann Hybrid Architecture," Proceedings of the 15th Annual International Symposium on Computer Architecture. Honolulu, Hawaii, May-Jun. 1988, pp. 131-140.
Veen, "Dataflow Machine Architecture," ACM Computing Surveys, vol. 18, No. 4, Dec. 1986, pp. 365-396.

(Continued)

*Primary Examiner* — Anna Deng
(74) *Attorney, Agent, or Firm* — Connolly Bove Lodge & Hutz LLP

(57) ABSTRACT

A programming language for representing processes as strings of symbols has a syntax delimiting places in a symbol string. A convention associates delimited places in symbol strings. An invocation construct instantiated as an invocation string. A definition construct instantiated as a definition. Completeness of input of the invocation destination list is sufficient for resolving the process defined by a definition string.

11 Claims, 32 Drawing Sheets

OTHER PUBLICATIONS

Nikhil et al., "Can Dataflow Subsume Von Neumann Computing?" Computation Structures Group Memo 292, MIT Laboratory for Computer Science, Nov. 15, 1988.

Arvind et al., "A Dataflow Approach to General-Purpose Parallel Computing," Computation Structures Group Memo 302, MIT Laboratory for Computer Science, Jul. 7, 1989.

Arvind et al., "Tagged Token Dataflow Architecture," Computation Structures Group Memo 229, MIT Laboratory for Computer Science, Jul. 7, 1983.

Arvind et al., "Why Dataflow Architectures," Computation Structures Group Memo 229-1, MIT Laboratory for Computer Science, Sep. 28, 1983.

Silc et al., "Asynchrony in Parallel Computing: From Dataflow to Multithreading," Parallel and Distributed Computing Practices, vol. 1, No. 1, Mar. 1998.

Arvind et al., "Dataflow Architectures," MIT Laboratory for Computer Science, Feb. 12, 1986.

Arvind et al., "The Evolution of Dataflow Architectures from Static Dataflow to P-RISC," Computation Structures Group Memo 316, MIT Laboratory for Computer Science, Aug. 2, 1990.

Dennis, "Data Flow Supercomputers," Computer, Nov. 1980.

Stephens, "A Survey of Stream Processing," Acta Informatica, Oct. 24, 1995.

Halbwachs et al., "The Synchronous Data Flow Programming Language LUSTRE," Proceedings of the IEEE, vol. 79, No. 9, Sep. 1991, pp. 1305-1320.

Gaudiot et al., "The Sisal Model of Functional Programming and its Implementation," Proceedings of the Second Aizu International Symposium on Parallel Algorithms/Architectures Synthesis, Aizu-Wakamatsu, Japan, Mar. 17-21, 1997.

Johnston et al., "Advances in Dataflow Programming Languages," ACM Computing Surveys, vol. 36, No. 1, Mar. 2004, pp. 1-34.

c. Daisy chain association

ABC[(A<$place1> B<$place2> C<$place3>)(placeA<$result1> placeB<$result2>) ... : ...]

METHOD AND LANGUAGE FOR PROCESS EXPRESSION

CROSS REFERENCE TO RELATED APPLICATIONS

The present application claims priority under 35 U.S.C. §120 to U.S. Provisional Patent Application 60/709,093, filed on Aug. 18, 2005, the disclosure of which is expressly incorporated by reference herein in its entirety.

BACKGROUND OF THE INVENTION

1. Field of the Invention

The invention is useful in the field of data processing, and in particular to a computer programming language which is generally and inherently concurrent and distributed, thereby enabling concurrent distributed processing systems.

2. Discussion of Background Information

By way of introduction, a computer program can be viewed as a series of instructions given to a computer. A computer program language is similar to the English language in that both use symbols to represent things and actions. For example, an English language cooking recipe uses strings of letters to form words that represent ingredients, such as "eggs" and "flour." The English language also assembles strings of letters, spaces, and grammatical symbols to represent actions, such as, "add two eggs to one cup of flour, and bake for 30 minutes." Computer programs similarly use sequences of symbols to represent things and actions. Computer programming languages differ from one another, among other ways, in their symbols and syntactical structures, similar to the way the English language differs from Chinese or Arabic in the choice of symbols and grammatical constructs.

A computer program can also be viewed as a symbolic representation of a process, where a process can be any progression of actions, changes, or functions that bring about an end or result. The result may be outside the computer that executes the program. For example, the process may be the manufacture of an item, communication of information to a distant location, or control of a vehicle, in addition to being the internal retrieval of data from a disc drive, the addition of two numbers in an arithmetic logic unit, or illumination of a computer display.

A programming language should be structured to facilitate the representation of processes generally, rather than being structured merely to represent processes available within a computer. A preliminary discussion of processes will assist in the appreciation of the invocation language discussed below.

Processes can be described generally and specifically. For example, "addition" can be described generally as the act or process of adding. It can be defined specifically by a series of rules, such as:

1+0=1

1+1=2

1+2=3 etc.

The act of addition can be performed in a specific instance for a particular set inputs. For example, in an overall process of balancing a savings account, a specific instance of addition could be performed after depositing a check using the specific check amount and the specific account balance at the time of deposit. Another specific instance of addition could occur at a later time when interest is credited to the account.

Stated more generally, the expression of a process is a specific performance of the process. In the account balance example, the addition process was expressed a first time when depositing a check, and it was expressed again when crediting interest.

SUMMARY

The invocation language described herein is a language of coordination boundaries in a structure of association relationships. It is uniformly expressive at all levels of abstraction and complexity from the value transform rules to the association and resolution of the most complex symbol structures. Because the language does not explicitly express coordination protocols, it is not tied to any particular machine model or any particular programming philosophy. As such it can conveniently map to diverse enlivenment environments from conventional electronic computers to natural biological systems.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF EXEMPLARY EMBODIMENTS

Figure 1A:
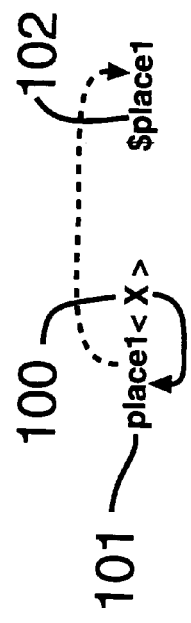
FIG. 1a illustrates a first place name associated with a second place elsewhere in a string by name correspondence.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

1. The Nature of Process Expression

Every expression of a process consists of two parts: a pre-expressible part and a part that is not pre-expressible. The pre-expressible part is an incomplete expression that defines a number of resolution possibilities but defers the expression of which possibility will occur. For the savings account example above, addition tables (or algorithms) define a number of addition possibilities. They are a pre-expressible part. The expression of a particular result is deferred until specific values for prior balance and check amount are combined with the pre-expressed definition.

For purposes of describing a programming language, certain symbol strings will be referred to as "names," such as a symbol string that [is or] represents a pre-expressible or a non-pre-expressible part of a process. In the savings account example, the non-pre-expressible part would be two numbers, such as the prior account balance and the amount of the deposited check. Each number could have a general name, such as <prior balance> or <deposit amount>. A name for a non-pre-expressible part may itself have multiple subparts. A name for a non-pre-expressible part of addition could be the following string of alpha-numeric symbols:

(<prior balance>,<deposit amount>)

When specific values come into existence for a name, such as <$1,500.00>,<$25.14>, the name is said to be formed or asserted. Before that time, while the name is an abstraction of possibilities such as (<prior balance>,<deposit amount>), the name is said to be deferred. When a formed name of a non-pre-expressible part is linked to a pre-expressible part, a specific instance of the process is expressed, e.g., ADD (<$1,500.00><$25.14>). When the process is completed and a result calculated, the process is said to be resolved. The result is itself a name. Upon performance of the process, the result name is said to be formed. Until then, the result name is said to be deferred.

A computer program may define a pre-expressible part of a process at the time the program is written, but a specific instance of process expression must await the formation of specific names of non-pre-expressible parts. While a pre-expressible part may only define a set of possible non-pre-expressible names, a pre-expressible part may specifically define a place where the non-pre-expressible name will be formed. The place may be a location within a symbol string that makes up a computer program. The pre-expressible part is said to defer to the place where a non-pre-expressible name may be formed. Such a place may be referred to as a place of deferment for the pre-expressible part. As will become appreciated more fully below, novel aspects of the language described herein relate to the symbol structures and syntax for representing pre-expressible parts and non-pre-expressible parts, including the designation of locations where non-pre-expressible names may be formed.

Large complex expressions can be viewed as a set or progression of concurrent sub-processes. For example, an account-balancing process may be defined as a set of sub-processes, including addition and subtraction, each of which may be expressed at different times within a larger algorithm. In such an expression, some non-pre-expressible names will be formed outside the process itself. That is, they will not be formed as a result of expression of any part of the program, but will be produced by the external environment. In the account balancing example, the check amount is determined outside the account balancing process. Such deferments are called process inputs. But many deferred names will be formed internal to an expression. In the account-balancing example, the adding a deposited check to a prior balance is an internal expression that forms a result name which in turn becomes a non-pre-expressible part of a subsequent sub-process of addition of interest.

As discussed above, a non-pre-expressible part cannot be defined at the time a program is written. But the definition of a pre-expressible part can define a place where the name of a non-pre-expressible part will come from. The result of one sub-process can also be associated with the non-pre-expressible part of another sub-process. These association relationships form a structure of association paths. Looked at in terms of definitions of pre-expressible parts (which is the perspective of a programmer writing a computer program), they form paths of deferment from where non-pre-expressible names will be formed. Looked at in terms of chronology of resolution (which is the perspective of a user executing a program), they form paths of fulfillment with the result of one sub-expression forming non-pre-expressible names for other sub-expressions. During resolution of a complex process, names are formed and resolved, and the results flow onward to other association paths fulfilling deferments. The results may divide and merge according to the nature of the process and ultimately form a final result name, commonly called the output of the expression.

An important aspect of process expression is this structure of association relationships. An important aspect of process expression is the coordinated flow of fulfillment. The structure of association relationships and flow coordination embody the unique expression of every process.

As will be appreciated from the discussion below, the invocation language described herein provides constructions and syntax for improved definition and coordination of process expression. The explanation below will highlight characteristics of symbolic string expression. Syntactic structures for symbolic process representation will be provided, followed by a discussion of sub-process coordination using those syntactic structures and specific examples. With this information, it is within the known skills in the field of computer science to write applications and compilers or translators to practice an invocation language as described in essential part below.

2. The Nature of a Symbol String Expression

Languages, including computer programs, are recorded as strings of symbols. This very sentence is a string of symbols, e.g., letters, spaces, and punctuation.

An important property of a symbol string is that it exists in an inherently limiting one dimensional expression space. In English, words are one-dimensional strings read from left to right. Sentences also are one-dimensional strings read from left to right.

A symbol in the string is associated by location with its direct neighbors, but a symbol cannot intrinsically associate with more remote places in the string. Contrast this to an electronic circuit in three-dimensional space in which any place in the circuit can potentially associate directly with any other place in the circuit via a wire connecting the two places. One-dimensional strings are inherently inadequate to express multi-dimensional processes.

To permit the description of multi-dimensional associations of processes using one-dimensional symbol strings, a symbol string expression must be map-able to higher dimensional forms of description. A means of describing higher dimensional relationships is required, such as means of delimiting, identifying, and associating any place within the string with any other place in the string. This is accomplished in the invocation language with two disjoint sets of symbols: syntax symbols and name forming symbols. Syntax symbols have meanings to delimit places in the string and to delimit local structures of association among these places in terms of nesting and contiguity. Places in a string are associated with name correspondence association. That is, a string forming a name is associated with other places elsewhere in the string having the same name. A syntax structure includes a name formed of contiguous name-forming symbols, and syntax structures can be remotely associated by name correspondence when their names are identical. A specific name can express only one association. A specific example of a syntax structure and name association will be provided below.

While neither syntax association nor name correspondence association is sufficient in itself to express complex association structures, each can extend or renew the expressivity of the other. As also shown in examples below, different syntax structures can be associated by name correspondence association. Different names can be associated by syntax structure association. Together, they are the warp and woof that, by mutually extending each other's descriptive capabilities, weave a tapestry of arbitrarily complex association relationships in a one dimensional string of symbols.

The structure of association relationships among delimited places in the string is the structure of deferment. By associating a first location in a string with a second, the second can defer the formation of a name to the first location. A formed name, such as a concrete numerical value replacing an abstract variable string, is presented at a delimited place and flows through the structure of association relationships fulfilling other deferments.

The symbols of the fulfillment names ultimately form a name correspondence association relationship with value transform rules, which are ultimate primitive functions that resolve without external reference. The content names and the association names of syntax structures are kept syntactically separate and do not get confused so they can use the same set of name forming symbols. These concepts will be better appreciated with study of the additional discussion below.

2.1 Abstract Passivity

Another consequence of the one dimensionality of the symbol string is that there is not enough inherent dimensionality for a symbol string expression to spontaneously resolve in the context of the string. That is, the string itself is not sufficiently complete to allow resolution without an external or other coordination mechanism. To be autonomously resolving, a symbol string expression must be mapped into an expression with sufficient dimensionality or interpreted within an expression of sufficient dimensionality. A symbol string expression is a purely referential form of expression. It makes reference to a possible expression of a process, but it is not the process itself.

A symbol string may reference a physical process, but the referenced physical process must be invoked for each instantiation. Since a symbol string is purely referential, it offers opportunities of deferment and abstraction that are not available to an expression that must be complete and spontaneously resolving. A symbol string can describe just the necessary relationships of a process and defer many of the details of behavior, such as coordination behavior until the time of expression. The deferred expressivity must be added during mapping or during interpretation. For example, a symbol string may refer to a mathematical operation, such as a Boolean logical AND but the process must be fully instantiated for each reference. A string expression can express a Boolean logical AND process only once and refer to the one expression of AND from many places of usage in the larger expression. Each (autonomously behaving) expression must fully express the AND process at each place of usage.

3. A Language of Association Relationships.

The invocation language is a language of association relationships expressing paths of deferral which, upon resolution, are paths of fulfillment. It specifies a set of syntax symbols to express the structures of association.

Primitive functions with pre-assigned symbols (such as Boolean operators AND, OR, and NOT, or other transform rules) are a particular form of association relationship expressed within the language. Other composite data types and their operators can be built in terms of these expressed primitives. The language can express association relationships among any set of data symbols that are disjoint from the syntax symbols. Consequently, there need not be pre-defined data types or data operators.

The invocation language behaves like a pipeline structure embodying resolution flow from association to association. Pre-expressible parts and non-pre-expressible parts are represented as symbolic strings. Pipelines form by associating resolution names of segments to input names of other segments. Once a name for a non-pre-expressible part is formed and associated with a pre-expressible part, a process expression is complete and can be resolved immediately and automatically, i.e., without a further external initiating event. The flow of resolution behavior is managed by the coordination behavior of the pipeline itself, and more specifically, by the set of association relationships defining the process. The state of the resolution of a process is maintained in the pipeline segments of the structure and is distributed through the behavior of the expression. There is no requirement for a separate addressable memory and consequently no requirement for a variable name referencing such a memory. The notion of explicit control need not arise, and the language does not require expressions of explicit control such as "jump" or "call."

There is no requirement for time relationships among neighboring places or of a common time referent in the language, so there is no requirement for an extended state of resolution that is reliably sample-able at any particular instant. The language assumes that the resolution behavior of an expression is symbolically determined.

The language captures the elegant simplicity of expressing concurrent and distributed behavior encompassing all forms of process expression from mathematics to biology.

3.1 The Syntax Structures

There are four syntax structures: the source place, the destination place, the invocation and the definition.

3.2 Source to Destination Association

Non-neighbor places in the string are associated by name correspondence between a source place and one or more destination places. The syntax structure for a source name and a destination name are shown in Table 1 below.

TABLE 1

| Syntax Name | Syntax |
|---|---|
| Source place | sourcename<string content> |
| Destination place | $destinationname |

The syntax for a source place is an abstract name, e.g., "sourcename" followed by delimiting symbols "<" and ">". At times, the string between delimiting symbols may be empty, such as "<>", though at times a value may appear between delimiting symbols, such as "<content>". The syntax for a destination place is the delimiting symbol "$" followed by an abstract name, such as "$destinationname".

Within a scope of reference, a source place with sourcename will associate with all destination places with a destinationname that is identical to the sourcename. (A scope of reference may be an invocation or definition, as discussed below.) When the content of a source place is formed (i.e., takes on a concrete value), it flows to each destination place of the same name. Until then, the correspondence of names forms an association. A source name will have a place where it is formed and a destination to which it flows. The place to which it flows is said to defer its content to the source place of the same name.

Figure 1B:
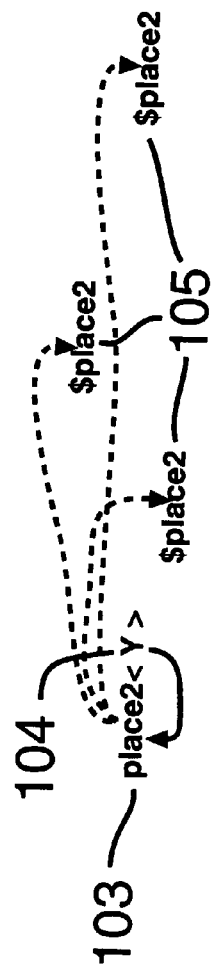
FIG. 1b illustrates a source place having content value with a fan-out association by name correspondence to three destination places.
Figure 1C:
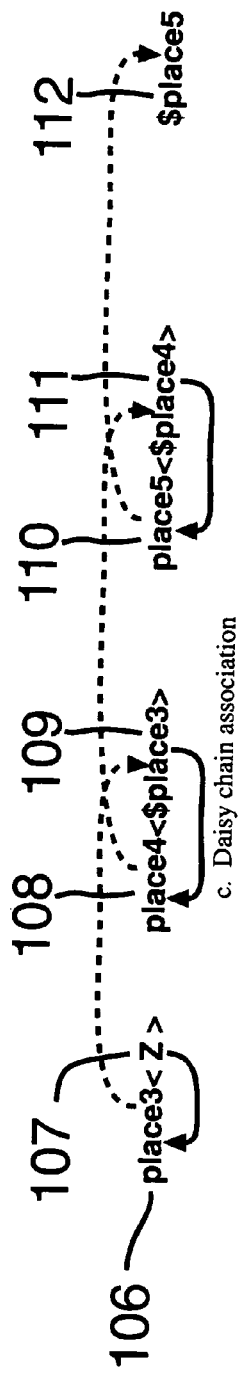
FIG. 1c illustrates a source place which is associated with destination by name correspondence.

FIGS. 1a-1c illustrate place association. In FIG. 1a through FIG. 1c, a solid arrow line is a syntactic association (formed by physical placement of a name in a string), and a dashed arrow is a name correspondence association (formed by identity of name at source and destination locations). In FIG. 1a, a first place 100, named place1, is associated with a second place elsewhere in a string 102 by name correspondence. When a name, X 100, is formed at place 1 (e.g., an input value is provided or a value is calculated at place 1), the value X 100 will flow autonomously from source place1 101 to identically-named destination place1 102. That is, no additional statements are required for the value X 100 to flow to place1 102. A source place may be associated with multiple destination places. FIG. 1b shows a source place named place2 103 having content value Y 104 with a fan-out association by name correspondence to three destination places named place2 105. The content value Y 104 will flow autonomously to all three destination places 105.

A single name can span only one association. A destination place may not also be a source place of the same name. To continue a thread of association, the destination place must be associated with a new source place name by syntax association. FIG. 1c shows a source place named place3 106 with a content Z 107 which is associated with destination $place3 109 by name correspondence association. Destination $place3 109 is associated with source place4 108 by syntax structure association. Source place4 108 is associated with destination $place4 111 by name correspondence association. Destination $place4 111 is associated with source place5 110 by syntax structure association. Source place5 110 is associated with destination $place5 112 by name correspondence association. When the value Z 107 in place3 106 is formed, it flows autonomously through the associations to destination $place5 112. These are discussed in more detail below.

A source place anywhere in the string can be associated to one or more destination places anywhere in the string. Source and destination places occur within invocations and definitions, as discussed below. An invocation expresses the associations of the formation of a name and its resolution. It associates with (invokes) a definition which expresses the resolution of the formed name.

3.3 The Invocation

An invocation is a named syntax structure of two parenthesized lists. The syntax, shown in Table 2 below, is an abstract name followed by two lists. Each list is delimited by parentheses.

TABLE 2

| Syntax Name | Syntax |
|---|---|
| Invocation | invocationname(destination list)(source list) |

The first list designates the input for the invocation and is called a "destination list" for reasons that will become apparent below in discussion of another syntax, the definition. The second list of the invocation designates the result of the invocation and is called the "source list" for reasons to be discussed below.

The invocation describes completeness boundaries for input name formation (destination list) and its resolution (source list). That is, the destination list identifies all inputs needed to carry out a process associated with the invocation name. Once all inputs take concrete form, i.e., once the input name is formed, the associated process can be performed to resolution. The source list identifies all values that result from the invoked process. This completion boundary reflects the natural partitioning of the process being defined and is a candidate for coordination control as discussed further in Section 4 below.

3.4 The Definition

A definition is a named syntax structure that corresponds to an identically named invocation. The syntax, shown in Table 3 below, is delimited by brackets. It contains two parenthesized lists delimited by parentheses, a place of resolution, and place of additional contained definitions, if any.

TABLE 3

| Syntax Name | Syntax |
|---|---|
| definition | definitionname[(source list)(destination list) resolution place: contained definitions] |

The source list identifies one or more places through which named inputs are received. The destination list identifies one or more places to which results are delivered. Elements of the definition source list correspond one-to-one with elements of a destination list of an identically named invocation. In addition, elements of the definition destination list correspond one-to-one with elements of a source list of the identically named invocation.

The resolution place is a place of resolution activity and contains the expression that resolves the name presented at the source list. The place of contained definitions contains local definitions for the resolving expression. Concrete examples will be discussed in Section 5 below.

3.5 The Association of Invocation and Definition

An invocation associates by name correspondence with a corresponding definition. That is, the invocation and definition have identical names. The lists of the invocation associate with the lists of the definition by syntactic structure. That is, the lists appear in the same sequence and with the same delimiting symbols after the syntactic name. The source list of the definition associates to the destination list of the invocation by order correspondence. That is, the elements appear in the same order. The destination list of the definition also associates to the source list of the invocation by order correspondence. This nomenclature might seem somewhat confusing at first, but the rationale is straightforward. The locations to which formed names will flow are called "destinations" and form source lists. Hence, from the point of view of the invocation, the "destination" list identifies locations in the definition to which formed names will flow, and the "source" list identifies locations in the definitions from which formed names will be received.

Figures 2A, 2B:
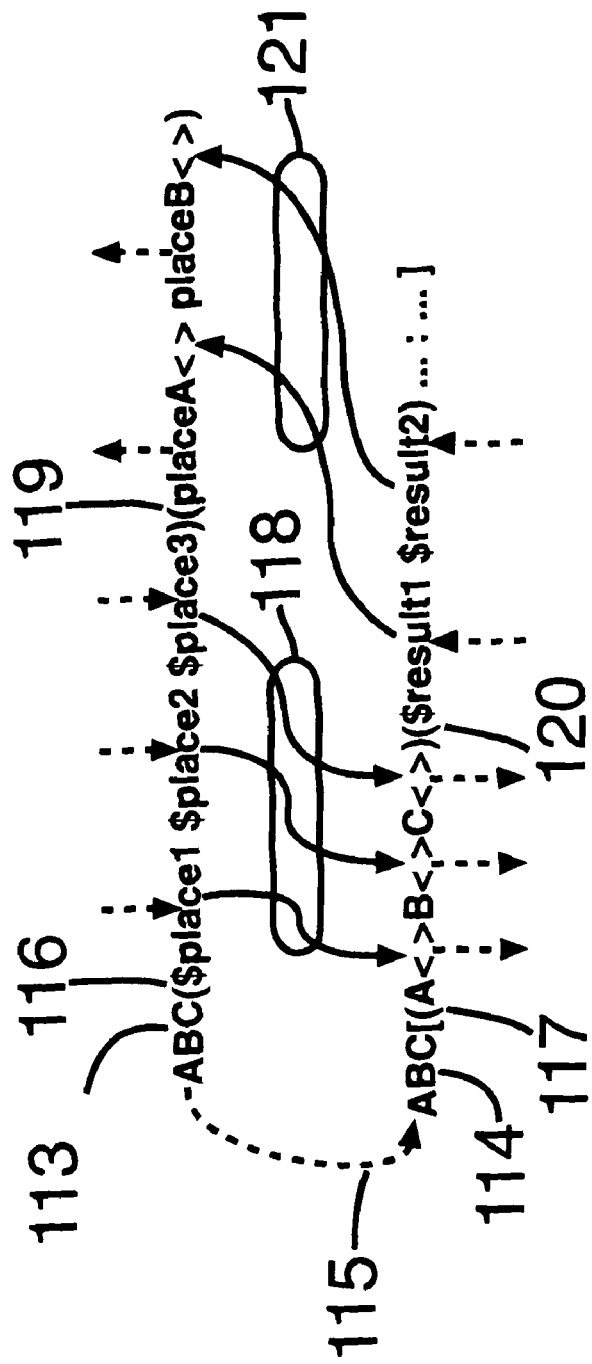
FIG. 2a illustrates an association by name correspondence of an invocation to an identically named definition.
FIG. 2b illustrates invocation lists merged with the definition lists.

In FIG. 2a. the invocation ABC 113 associates by name correspondence 115 to identically named definition ABC 114. (Note that the syntax of the definition uses brackets, while the syntax of invocation has only two lists delimited by parenthesis.) Elements of the invocation destination list 116 associate by order 118 with the elements of the definition source list 117. Elements of the invocation source list 119 associate by order 121 with the elements of the definition destination list 120. The destination list of the invocation 116 is places to where contents flow to form the name to be resolved. The source list of the definition 117 is the places from which the components of the formed name flow to the resolving expression. The destination list of the definition 120 is the places to where the results of the resolving expression will flow, and the source list of the invocation 119 is the places from which results will flow to their destinations. A destination place in the destination list of the invocation becomes a source place in the source list of the definition. A destination in the destination list of the definition becomes a source place in the invocation.

The relationships can be understood in terms of daisy-chaining. FIG. 2b conceptually shows the invocation lists merged with the definition lists showing the syntactic daisy chaining relationships between the invocation and definition lists. Each destination place is shown as content occupying its corresponding source place. The syntax structure relationship between the lists isolates the place names, and a definition becomes an isolated scope of name reference.

3.6 Abbreviated Forms of the Invocation and Definition

An invocation or a definition may have abbreviated forms relative to the more general forms discussed above.

At times, an element in an invocation source list need not be explicitly expressed. This can occur when, for example, an invocation distributes fewer than all the results of a definition. Then a result of a definition (identified as an element of a definition destination list) need not be associated with any location other than the invocation. To maintain the syntax for correspondence of elements between an invocation source list and a definition destination list, an abbreviated "placeholder" in the source list may be used. The association of one of the results in the source list of an invocation with the place of the invocation itself can be expressed with an unnamed source place, as shown by the presence of delimiting symbols "< >" without a preceding place name as shown below.

TABLE 4

| invocationname(destination list)(place1< > < >) |
|---|

In the invocation shown in Table 4, the first place of the source list of the invocation will be associated to destination places named place1. The unnamed second place of the source list of the invocation will be associated by default with the place of the invocation. An example of this syntax form is the invocation for FULLADD discussed in Section 5.

At times, an invocation need not distribute any results but receives a single result in place. Then, it does not need a source list at all, as shown in Table 5.

TABLE 5

| invocationname(destination list) |
|---|

The corresponding definition need not have a destination list, thus implying that a single result is associated to the place of the invocation. An un-named source place in the resolution expression of the definition, as shown in Table 6 will express the single output. (The source place is within the resolution expression.) An example of this syntax form is the invocation for AND discussed in Section 5 (used within a definition for FULLADD).

TABLE 6

| definitionname[(source list) <resolution expression>: encompassed definitions] |
|---|

If an invocation has an empty destination list, as shown in Table 7, then the invocationname itself is the fulfillment name which names the definition to be invoked. This is typically an invocation of a value transform rule definition. See, for example, the statement in Table 19, "res<$X$Y$Z>" which, when formed, resolves into a single bit value within a transform rule.

TABLE 7

$place1$place2$place3( )

At times, a definition may have only a constant as its result as shown in Table 8. This can occur for a value transform rule. The constant, which is the resolution of the formed name, will be returned to the place of the invocation.

TABLE 8 definitionname[constant]

At times, a process may opportunistically form names of value transform rule definitions. Then, contents may flow into a place of resolution, which may be a list without parenthesis, as shown in Table 9. There is no explicit invocation, and the contents flowing into a place of resolution are assumed to be free associating values of a pure value expression. See, for example, the statement in Table 19, "$X$Y$C" which, when formed, spontaneously resolves into values which themselves may combine to form new values according to the definition.

TABLE 9

$place1$place2$place3.... :

3.7 Expression Structure

Figure 3:
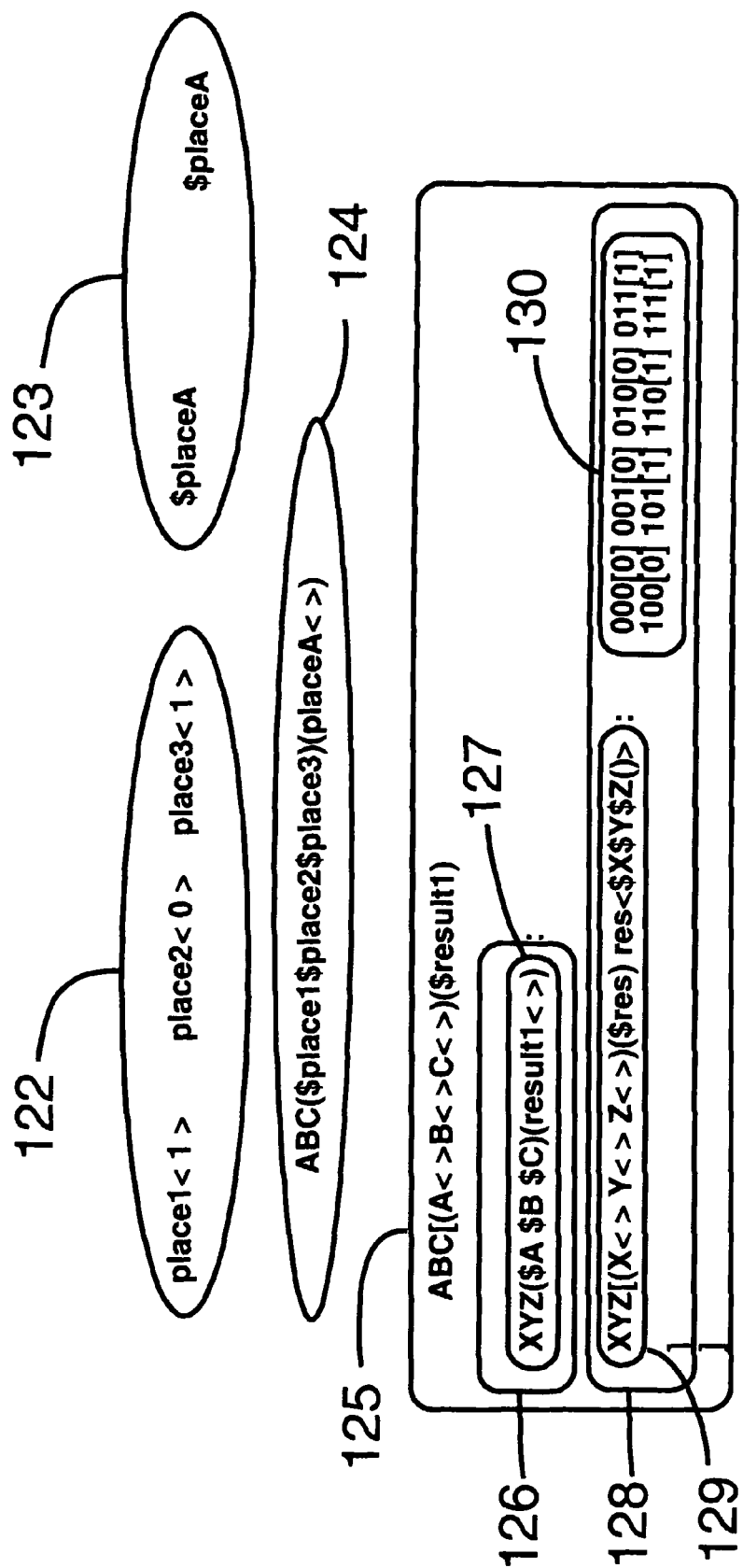
FIG. 3 shows the component structures of an example expression.

FIG. 3 shows the component structures of an example expression. There are some outlying source places 122 (e.g., external inputs) and destination places 123 (e.g., outputs). There is an ABC invocation 124 and identically-named ABC definition 125. Within the ABC definition, a resolution place 126 is provided which itself contains an invocation XYZ 127 and a place of contained ABC definitions 128. The definition of XYZ 129 itself contains a set of value transform rule definitions 130. This is but one of many possible forms of expression, and is provided here for illustration of certain concepts.

3.8 The Flow Structure

Figure 4:
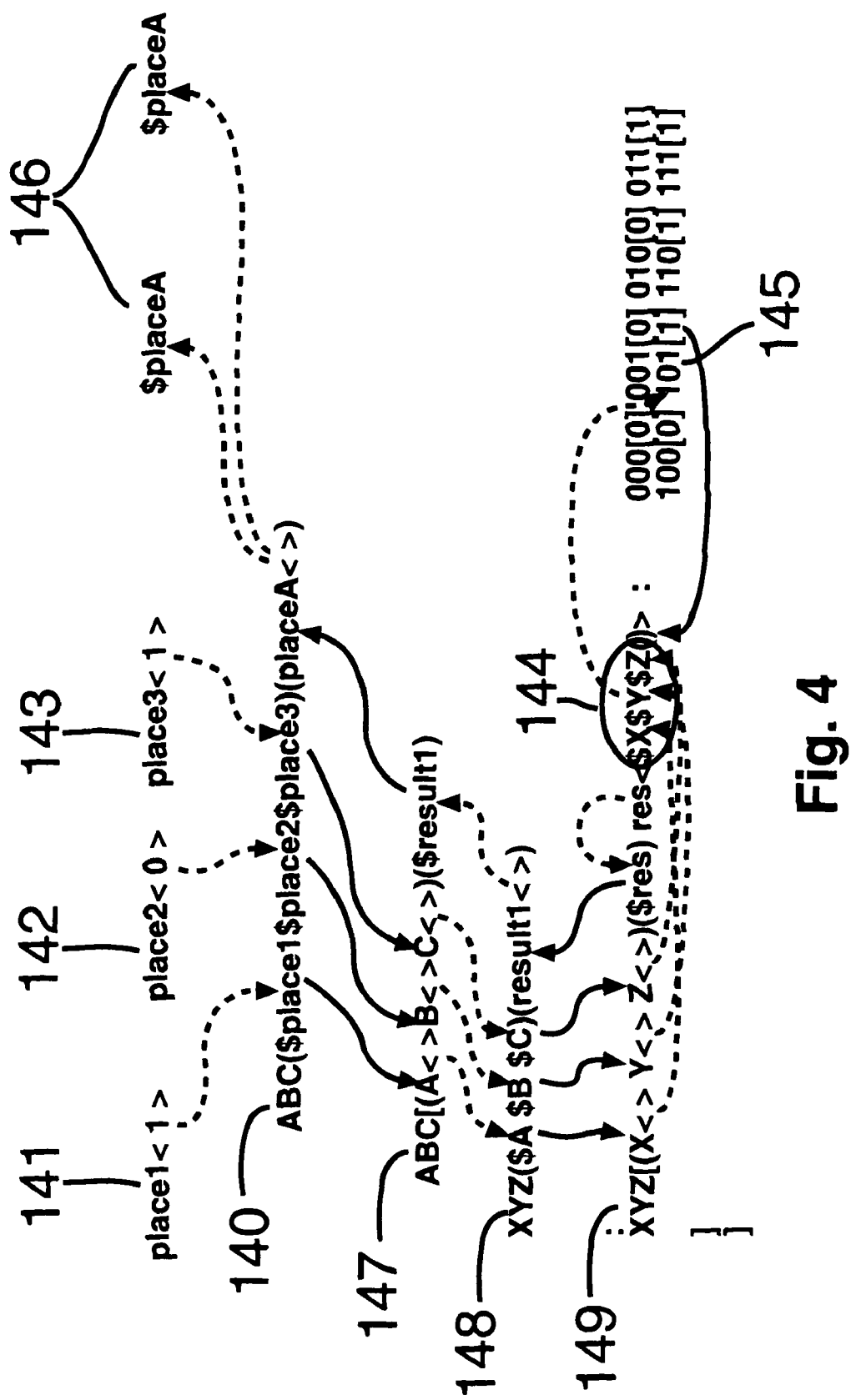
FIG. 4 illustrates name correspondence association.

FIG. 4 shows the association flow for the expression of FIG. 3. When names are formed in source places 141, 142, 143 (that is, when concrete values are presented), their contents flow by name correspondence to the destination of ABC invocation 140. There, the contents form a compound name for the destination list of the invocation of ABC 140. In the particular example of FIG. 3, the specific name formed for this expression of ABC would be "1,0,1". The name formed in the destination list of the invocation in turn flows by syntax correspondence to the source list of definition ABC 147. From there, the formed name flows by name correspondence to the destination list of invocation XYZ 148. From there, the formed name flows by syntax correspondence to the source list of definition XYZ 149. The formed name flows by name correspondence into the destination places $X$Y$Z 144 in the place of resolution forming an invocation 101( ). That, in turn, invokes the transform rule 101[1] 145, which returns the result value "1" to the resolution place ($res) of the XYZ definition 149. From there, the result value "1" returns by syntax correspondence to the source list of the XYZ invocation 148, and then by name correspondence, to the destination list of the ABC definition 147. From there, the result "1" returns by syntax correspondence to the source list of the ABC invocation 140, and then by name correspondence to destination locations 146 distant from the invocation 140.

FIG. 4 illustrates name correspondence association by dashed lines and syntax structure association by solid lines. Each extends the reach of the other weaving association pathways through the invocations and definitions.

4. Coordination of Content Flow

The language expresses the structure of association relationships through which content flows. It allows content to flow through the association pathways without explicitly defining coordination. It is assumed that the implementation environment or interpreting environment will ensure that each operation is completed before the next operation is commenced. (After having understood the structure and syntax contained herein, it is within the skill in the compiler and translator arts to provide such implementation or interpreting environment.) The language specifies the sequence but need not specify the details of coordinating the sequence. Such coordination may be specified in the language, but preferably it will be implemented at lower levels of the execution environment. Similarly, the invocation language specifies the association relationships but need not explicitly define the coordination of the content flow through the paths of association. Again, that coordination may be implemented at lower levels of the execution environment. Preferably, the language assumes that any implementation or interpretation will include the expression of the proper coordination behavior.

While the coordination of content flow through a path of association relationships is somewhat more involved than—make sure operation A is completed before commencing operation B—it can, nevertheless, be expressed as a convention. As such, the coordination behavior need not be expressed with each instance of association but can be deferred by the language as a universal convention of expression.

Guidelines for coordination are provided in this section.

4.1 The Flow Place

A flow path is a programming construct useful for coordinating content flow. It is a series of two or more associated places. The beginning of a flow path is a source place, and the end of a flow path is a destination place. A flow place is a place that serves as both a destination place and a source place. FIG. 1c illustrates a flow path with multiple flow places. Place3<Z> 106 is a source for content <Z> 107. $place5 112 is a destination place. The content <Z> may flow through a series of associations from place3<Z> 106 to $place5 112. Along the way, place4 108 is associated with place3<Z> 106. It is also associated with place5 110. The place forming the association of place4 108 with $place3 109 is a flow place. Similarly, place5 110 is associated with place4 108. The place associating place5 110 and $place4 111 also is a flow place.

A flow place has a destination mode of behavior and a source mode of behavior. A flow place behaves alternately as a destination place with content flowing in and as a source place with content flowing out. A flow place can be understood as a syntactic association of a destination place, such as $place3 109 and a source place, such as place4 108. Each flow place coordinates content flow with its association neighbors, thereby coordinating the flow of content through the expression as a whole. This coordination is performed in terms of dependent behaviors between flow places and within flow places. Dependent behaviors are discussed below.

4.1.1 Dependent behaviors

As content moves from a first flow place to one or more successor flow places, the first flow place must maintain and assert the content until all immediate successor flow places accept the content and begin maintaining it. ("Assertion" of content here means that the content is existent, rather than deferred, and valid to be received by a successor flow place.) Once all immediate successor flow places are maintaining the content, the first flow place can cease maintaining the content and become empty. ("Empty" here means the place no longer asserts the content.) After being empty, the first flow place can accept a next content from a predecessor place. A flow place must not accept a next content until it has become empty. A flow place cannot pass on a next content until after it has validly received that next content. In this way, a flow place of a process can be expressed for a fully formed input, complete its expression, and be re-expressed later without intermingling partial results from a prior expression.

4.1.1.1 Dependent Behavior Between Flow Places

The dependent behavior between flow places is between the source mode of a flow place and the destination mode of a successor flow place. In FIG. 1c, for example, the receipt of content to $place3 109 represents the destination mode of a flow place, while the sourcing of data from place4 108 represents the source mode of the flow place. These behaviors can be implemented by imbuing flow places with signaling behavior as follows:

The destination mode sends a "request" for content to the source mode declaring that the destination is empty and ready to receive a next content.

The source mode sends "content" to the destination thereby declaring that the source contains content and is sending it.

The destination mode sends "thanks" to the source mode declaring that the destination mode has received the content, is maintaining it and that the source mode no longer needs to maintain it.

The source mode sends "welcome" to the destination declaring that (i) the source is no longer maintaining the content, (ii) the source mode has become empty, and (iii) the next content sent will indeed be a next content.

The "welcome" is the delimiter between successive contents that prevents their being confused and ensures that each flow place passes a content on before receiving the next content. A destination mode will not request or accept new content until after receiving "welcome," and the source mode will not assert a new content until strictly after sending "welcome".

The following presents typical dependent behaviors that effect coordination.

4.1.1.2 Dependent Behavior Within Modes

A source mode will send "content" after receiving a "request".

A source mode will send "welcome" after receiving "thanks".

A destination mode will send "thanks" after receiving "content".

A destination mode will send "request" after receiving "welcome".

4.1.1.3 Dependent Behavior Between Modes Within a Flow Place

A source mode sends "content" after the destination mode has received "content".

A destination mode receives content only after the source mode has sent "welcome" and become empty.

Other signaling behaviors may be possible as long as they prevent intermingling of content from one expression of the process to another expression of the same process.

As discussed above, the flow places are a programming construct useful for coordinating content flow. The flow of content may be understood as if regulated by communication protocols between and within flow places.

4.2 The Flow Protocol

Figure 5:
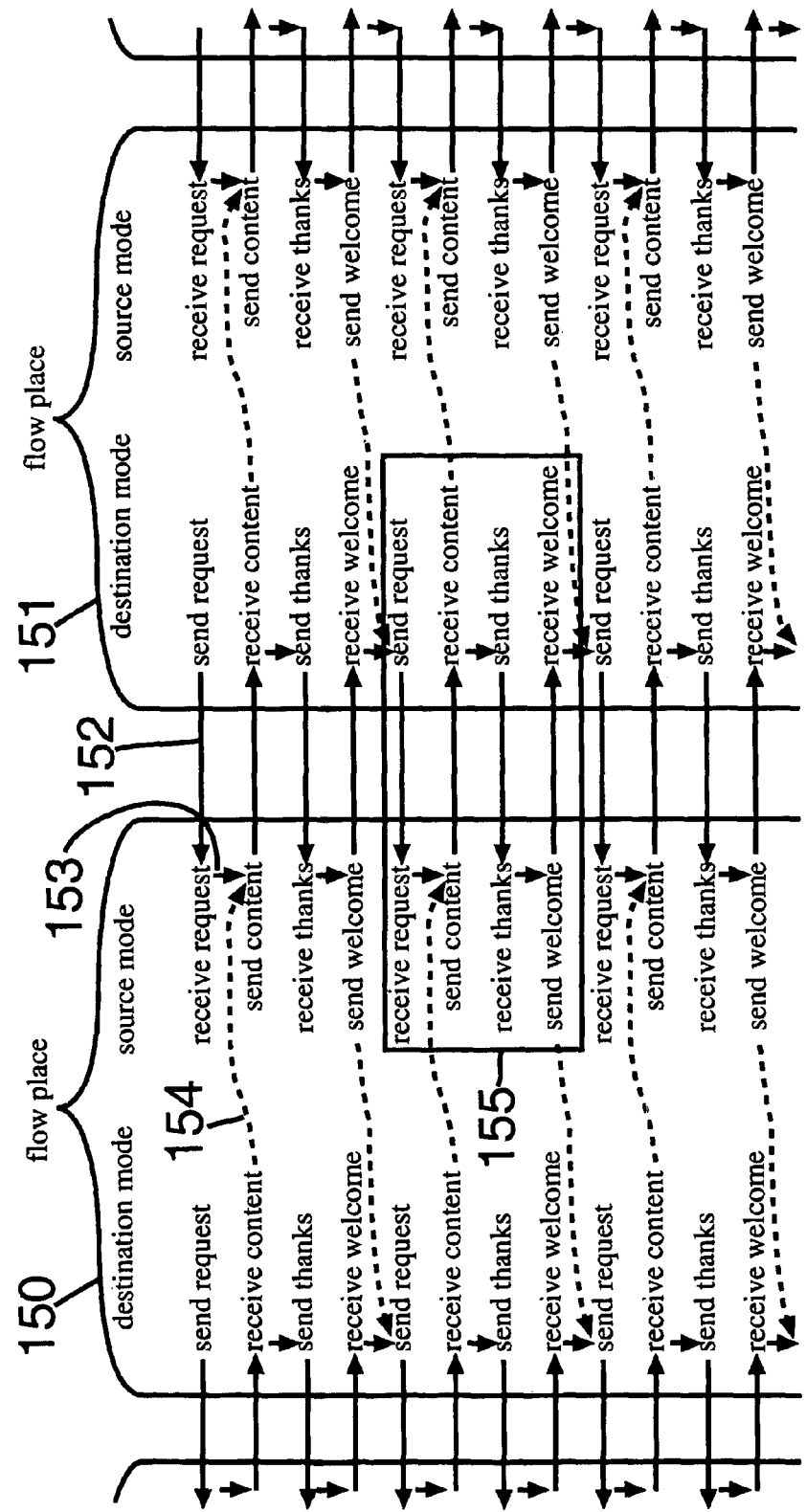
FIG. 5 illustrates interlocking dependent behaviors coordinating the flow of content through flow places.

FIG. 5 illustrates interlocking dependent behaviors coordinating the flow of content through flow places. Two complete flow places 150, 151 are shown with an illustration of their internal mode behaviors. A horizontal solid-line arrow indicates a dependency relationship between flow places. A vertical solid-line arrow indicates a dependency relationship within a mode. A dashed-line arrow indicates a dependency relationship between modes within a flow place. Each mode has the four behaviors, discussed above, that occur in a sequence which repeats indefinitely for successive contents. Highlighted box 155 illustrates one set of the four behaviors.

Figure 6:
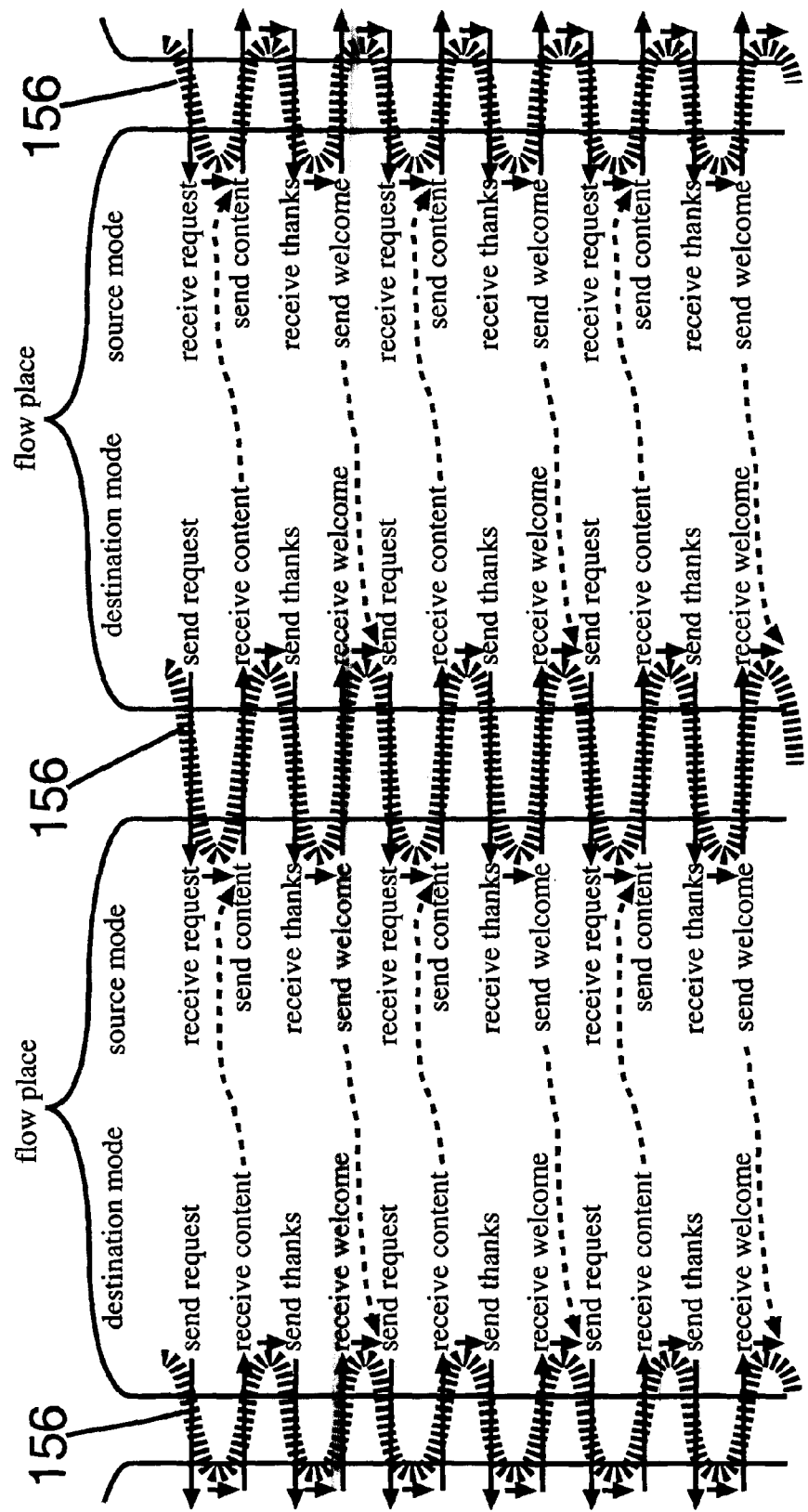
FIG. 6 illustrates dependency relationships between flow places and within modes.

If one considers the dependency relationships between flow places and within modes, a sequence of dependent behavior can be traced, illustrated by the thick dashed zig-zagging paths 156 zipping two flow places together, as shown in FIG. 6.

4.2.1 Four-Phase Handshake Protocol

Figure 7:
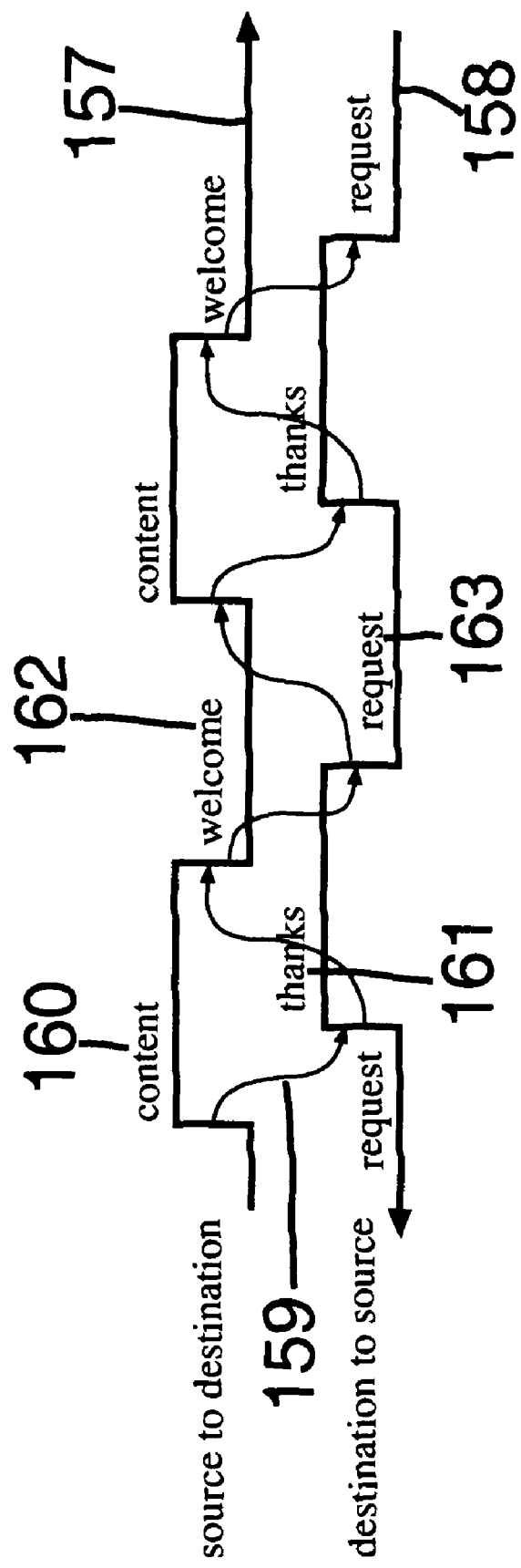
FIG. 7 illustrates an inter-flow-place dependency behavior.

FIG. 7 illustrates the inter-flow-place dependency behavior. It is a four-phase handshake protocol which is presented as two opposite direction signals 157, 158 with interlocking behavior coordinating the transfer of content between two places. Only the send behaviors are explicitly illustrated by the signals, which are labeled with the behavior names. The receive behaviors are implied by the send behaviors and are illustrated by arrows 159. The sending of "content" 160 implies that a request was received. The sending of "thanks" 161 implies that the content was received. The sending of "welcome" 162 implies that the "thanks" was received. The sending of "request" 163 implies that the welcome was received.

The four phase handshake protocol provides partial coordination between immediately-interacting flow places. But the four-phase handshake does not provide coordination within a flow place. Additional coordination behavior is provided by the dependency relations between modes inside a flow place. The combination of intra-flow place coordination by dependency relations and inter-flow-place coordination by the handshake protocol provides for coordinated behavior spanning arbitrary numbers of flowplaces.

4.2.2 Dependencies Between the Internal Behavior Modes

Figure 8:
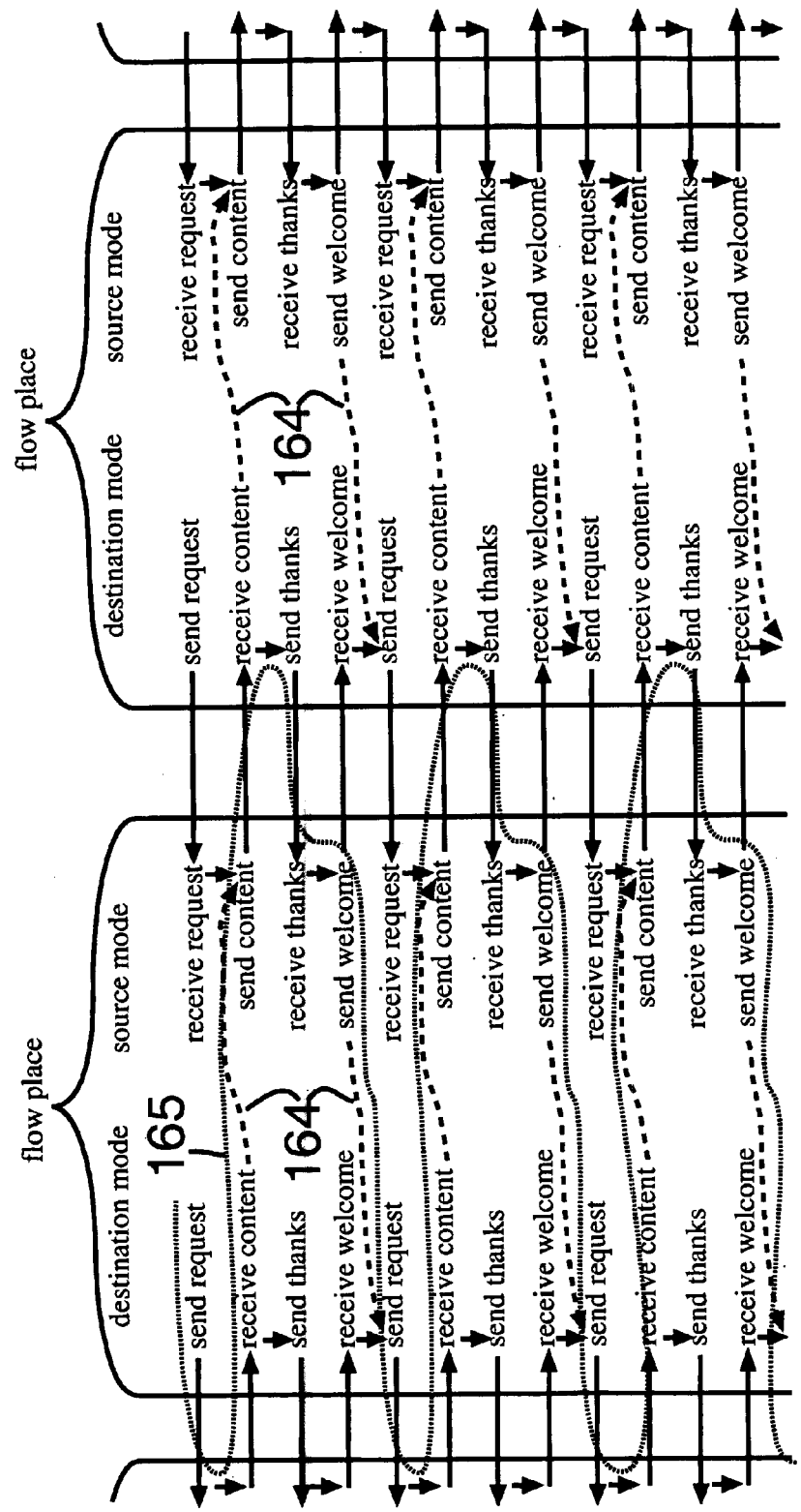
FIG. 8 illustrates dependency relationships between modes within a flow place.

If one considers the dependency relationships between modes within a flow place, as shown as dashed line arrows 164 in FIG. 8, another strict sequence of dependent behavior can be traced, illustrated by the finely dashed zigzag path 165 spanning three flow places (one only partially shown).

Figure 9:
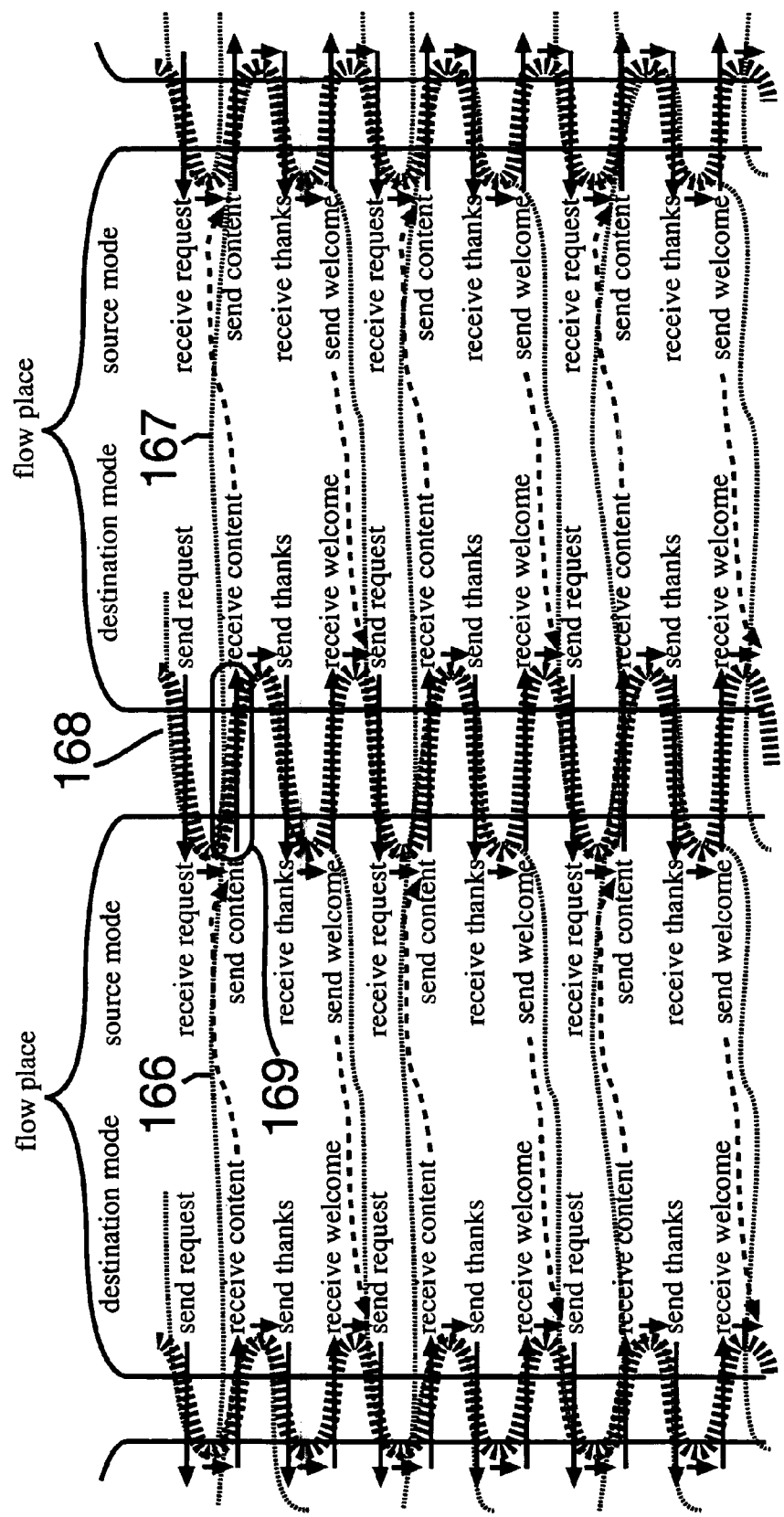
FIG. 9 illustrates three dependence sequences.

This spanning dependency behavior shares dependencies with the zipping dependency behaviors linking the zipping dependency behaviors. FIG. 9 illustrates three dependent sequences intersecting from send content to receive content 169: (i) the dependency path through the left flow place 166, (ii) the dependency path through the right flow place 167, and (iii) the zipper dependency path between the two flow places 168. This sharing of dependency behaviors among the dependency sequences coordinates the flow of content from flow place to flow place through a structure of association pathways.

4.3 Expressing the Coordination Protocol

While the protocol presented above is straightforward and forms a sufficient basis for coordination behavior, there can be many variations of dependent behaviors that are sufficiently coordinating. Parts of the protocol can, for instance, be expressed with timing relationships instead of dependent behavior relationships. A two phase handshaking protocol may be used with just the "content" and "thanks" behaviors.

The "welcome" and "request" behaviors may be expressed as timing relationships. The extreme version of timing is the clock. The clock continually expresses "send content". All the other coordination behaviors are subsumed by the timing interval with the assumption that all behaviors of each flow path and each flow place are completed within the clock period.

There are also variations of the coordination protocol in terms of dependent behaviors. Parts of the protocol may be phased differently. In FIG. 9, for instance, three dependence sequences share two behaviors: send content and receive content. However, the three sequences only need to share one behavior to be effective.

As presented above, send "content" occurs after a "request" is received by a source mode. Another way to express the relationships, shown in FIG. 10, would be for the source mode to immediately send the "content" 170 and then wait for the "thanks" 171. The receiving destination mode, instead of sending a request, will just become locally receptive. If a content is presented, it will "accept" 172 it and send a "thanks" 173. If a content is not presented, it will await the presentation of a content, then "accept" 172 it and send the "thanks" 173. The difference is where the wait occurs. Three dependency paths intersect and share dependency behavior at receive content 174.

Figure 10:
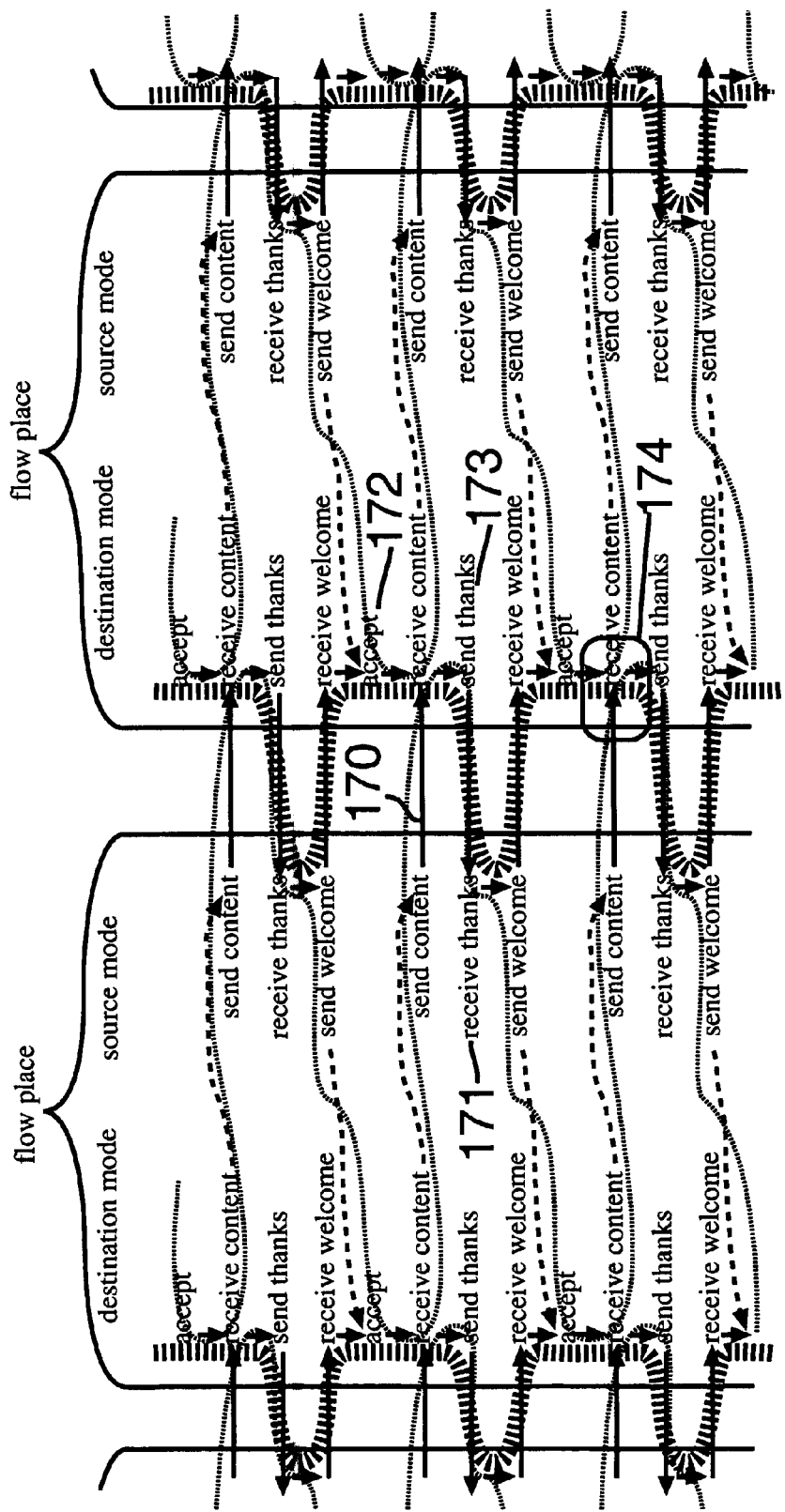
FIG. 10 illustrates send "content" occurring after a "request" is received by a source mode.

The protocol of FIG. 10 looks quite different, but all three dependency paths still share an interlocking dependent behavior and effect the coordination.

4.3.1 Coupled Ring Oscillators

Figure 11:
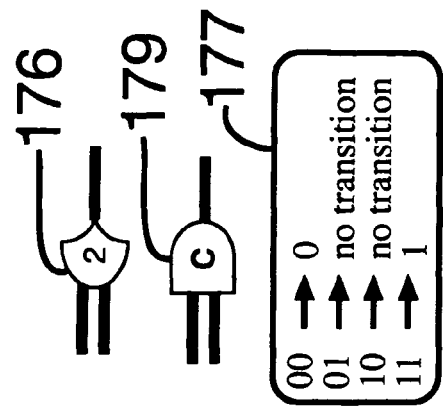
FIGS. 11a and 11b illustrate logic functions.
Figure 11:
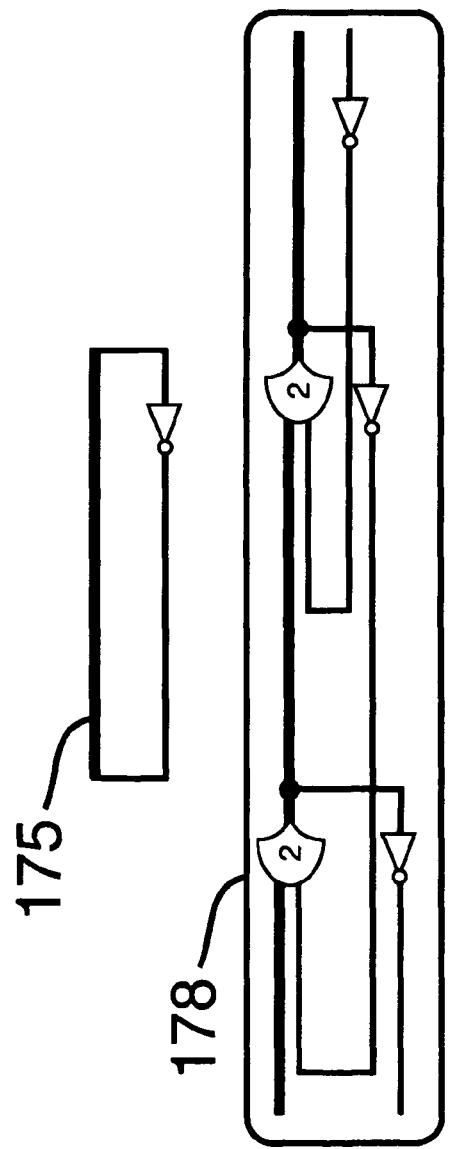

Another model for implementing a coordination behavior protocol is in terms of binary ring oscillators coupled by completeness relationships, as shown in FIG. 11a. FIGS. 11a and 11b illustrate logic functions, some of which are well known as "Boolean" functions, some of which are known as Muller C-elements, and others of which are sometimes called Null Convention Logic and described in U.S. Pat. No. 5,305,463 and related patents (e.g., continuations and continuations-in-part). A binary ring oscillator is a closed path expression with a single inverter which continually transitions between two values 0 and 1 175. Ring oscillators can be coupled, and their behavior coordinated by sharing a path through a completeness operator. The completeness operator may be a NULL Convention Logic 2-of-2 operator 176 or a Muller C-element 179. The completeness operator transitions its output only when both inputs are the same and then transitions its output to the same value as the inputs. The completeness operator 176 and its transition map 177 and a linear association of coupled oscillators sharing a completeness path 178 is shown in FIG. 11b.

Figure 12:
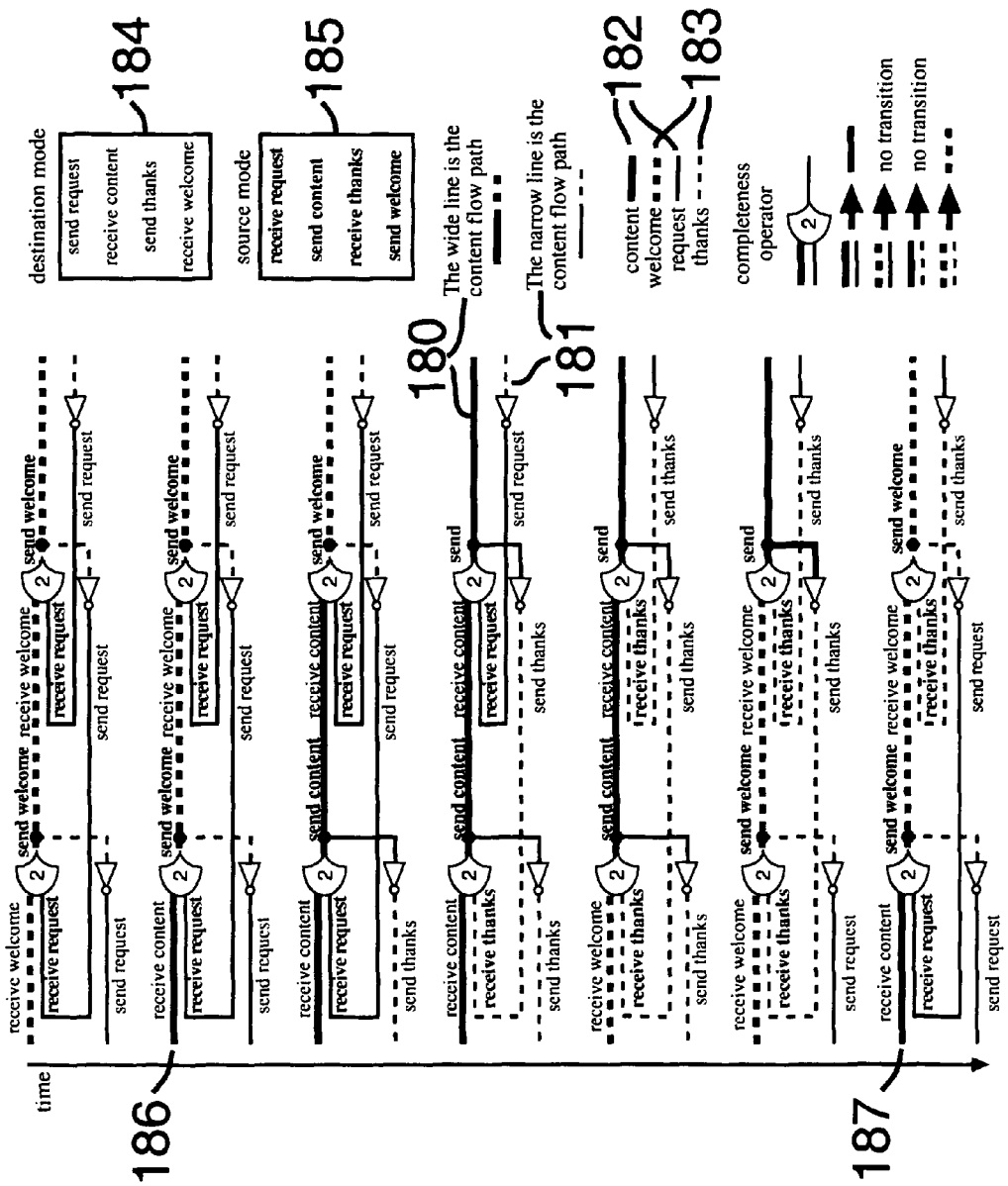
FIG. 12 illustrates a time sequence of behavior of a coupled ring oscillators.

A time sequence of behavior of the coupled ring oscillators is illustrated in FIG. 12. Each completeness operator is conceptually a flow place. The heavy weight path 180 is conceptually a content flow path from a source mode to a destination mode. The light weight path 181 is the acknowledge path from a destination mode to a source mode. A path can assert two values: solid 182 and dashed 183. Each path and its asserted value relates directly to a behavior of the coordination protocol, which is shown by labeling each path with the coordination behavior name. Destination mode behaviors are in plain text 184 and source mode behaviors are in bold text 185. The time sequence shows the flow of one content 186 through the structure and the beginning of the next content 187.

Figure 13:
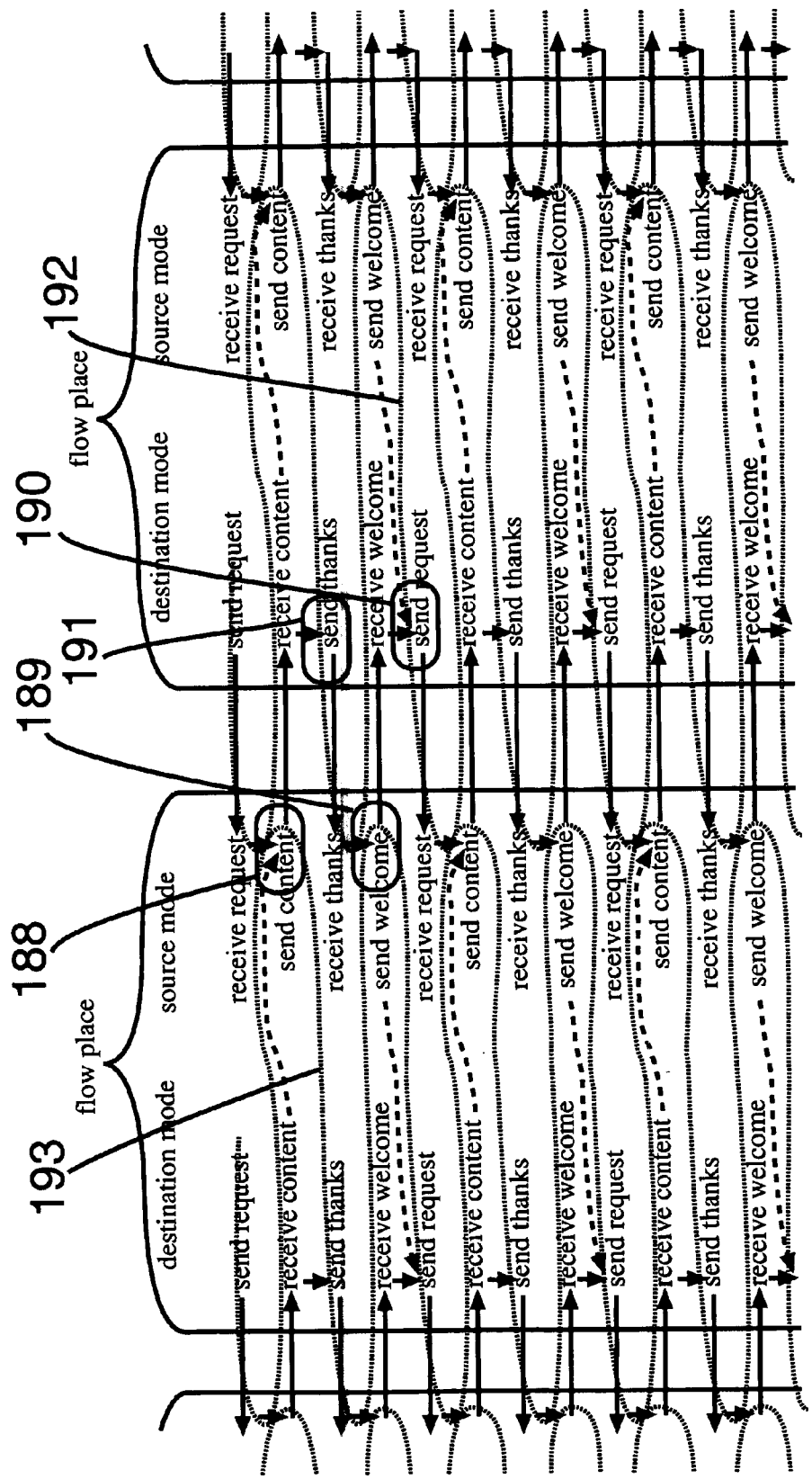
FIG. 13 illustrates dependent behavior sequences for a coupled oscillator implementation

Binary ring oscillators coupled by completeness relationships implement a complete coordination protocol. FIG. 13 shows the dependent behavior sequences for the coupled oscillator implementation. There is not a separate, inter-flow place dependent behavior sequence, but all the same dependency relationships are present. The dependent behavior sequence of each flow place shares the send content behavior with the dependent behavior sequence of a predecessor flow place, thus coordinating the behavior of the flow places. "Send content" is dependent on "receive request" and "receive content" 188. "Send welcome" is dependent on "receive welcome" and "receive thanks" 189. "Send request" occurs (preferably strictly) after "receive welcome" 190. "Send thanks" occurs (preferably strictly) after "receive content" 191. "Send welcome" and "send request" are dependent, because they are the same signal 192. "Send content" and "send thanks" are dependent, because they are the same signal 193.

4.3.2 Summary of Coordination Behaviors

A coordination protocol can be implemented in many ways at different levels of abstraction from signal levels to token flow to message passing. It is simply a matter of expressing appropriate dependent behavior at each level. It is within the skill of the computer science art, and especially the art of software simulators, compilers, and interpreters, to write a acompiler, a translator or interpreter implementing the syntax structures and coordination behaviors described here. Alternately, the syntax structures and coordination behaviors described here could be implemented in hardware as a machine of multiple, distributed FPGA's. Each invocation would be mapped to one of the multiple FPGA's and resolved when the input name is completely formed. Because each invocation is complete, each of many invocations may be resolved distributively and independently. Multiple distributed Alternately still, the syntax structures and coordination behaviors can be simulated in an existing programming language, such as C++.

4.4 The NULL Convention

Implied in the protocols is the completeness of each behavior before the next behavior occurs. While most of the behaviors are single binary relations and their completeness of behavior (transition) can be trivially appreciated, a content behavior can be a large composition of transition behaviors. A preferred coordination implementation employs a NULL convention in which a content may assume a value, called NULL, which can be used to indicate completeness or more accurately, emptiness.

Figure 14:
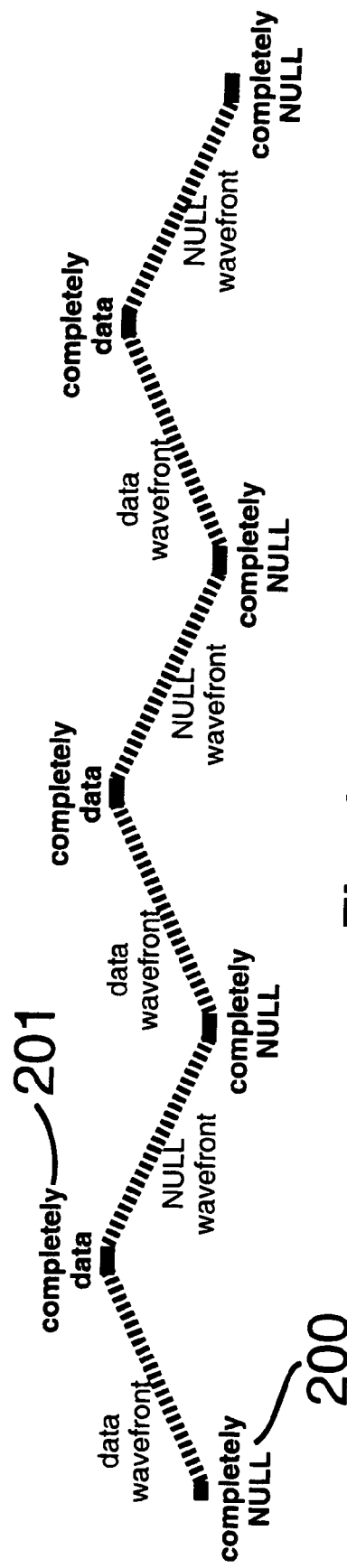
FIG. 14 illustrates a monotonic transition between completely empty (completely NULL) and completely full (completely data) states of a flow place.

In its most basic sense, completeness is an emptiness that has been filled. The appreciation of the emptiness and the appreciation of the fullness can be expressed in different ways at different levels of abstraction. At the most primitive level of expression with only the most primitive behaviors available, emptiness and fullness must be expressed by the content itself. If the content to be resolved is called data, then there must be an explicit content state that represents not-data and which is disjoint from the content states that represent data. The NULL convention provides just such an expressivity. An extra, unique content value called NULL is added to the normal content data values and is defined to mean not-data. When the content of a flow place is all NULL, it means that the flow place is empty. When the content of a flow place is all non-NULL or all data values, it means that the flow place is complete and full with data content. This establishes two easily appreciable states of a flow place, empty and full. Monotonic transition between completely empty (completely NULL) 200 and completely full (completely data) 201, shown in FIG. 14, reduces the content behavior to a binary relation that can conveniently serve in a coordination protocol.

When a transition occurs from empty to full at the flow place it means that a content propagation is completely received. When a content is passed on, a flow place must return to the empty state to be able to appreciate the reception of the next content. This reset to the empty state is implied in the "welcome" behavior. In this case the propagation of the NULL wavefront is the "welcome" and also sets the content of a place to empty.

Additional discussion of the concepts of completeness and Null can be found in U.S. Pat. No. 5,305,463 and related patents.

4.5 The Completeness Criterion

Programming in the invocation Language involves describing processes as complete sub-processes. That is, an invocation and its associated definition are capable of being expressed and resolved once a complete input name is formed. Programmers will find it helpful to understand and ultimately define processes in terms of complete sub-processes. A discussion of completeness will facilitate that understanding.

In resolving a formed name, the completeness states must be appreciated at the input, and the monotonic completeness behavior must be maintained at the output. "Appreciate" in this context means that the process that accepts the input can determine that the input is complete and ready for resolution. The completeness criterion states that the transition of the output implies the completeness of the input. This appreciation begins with operators defined as sets of value transform rules.

The concept of completeness can perhaps be best understood in the context of a hardware circuit. Once understood in that context, it can be applied in the context of a software language.

Figure 15:
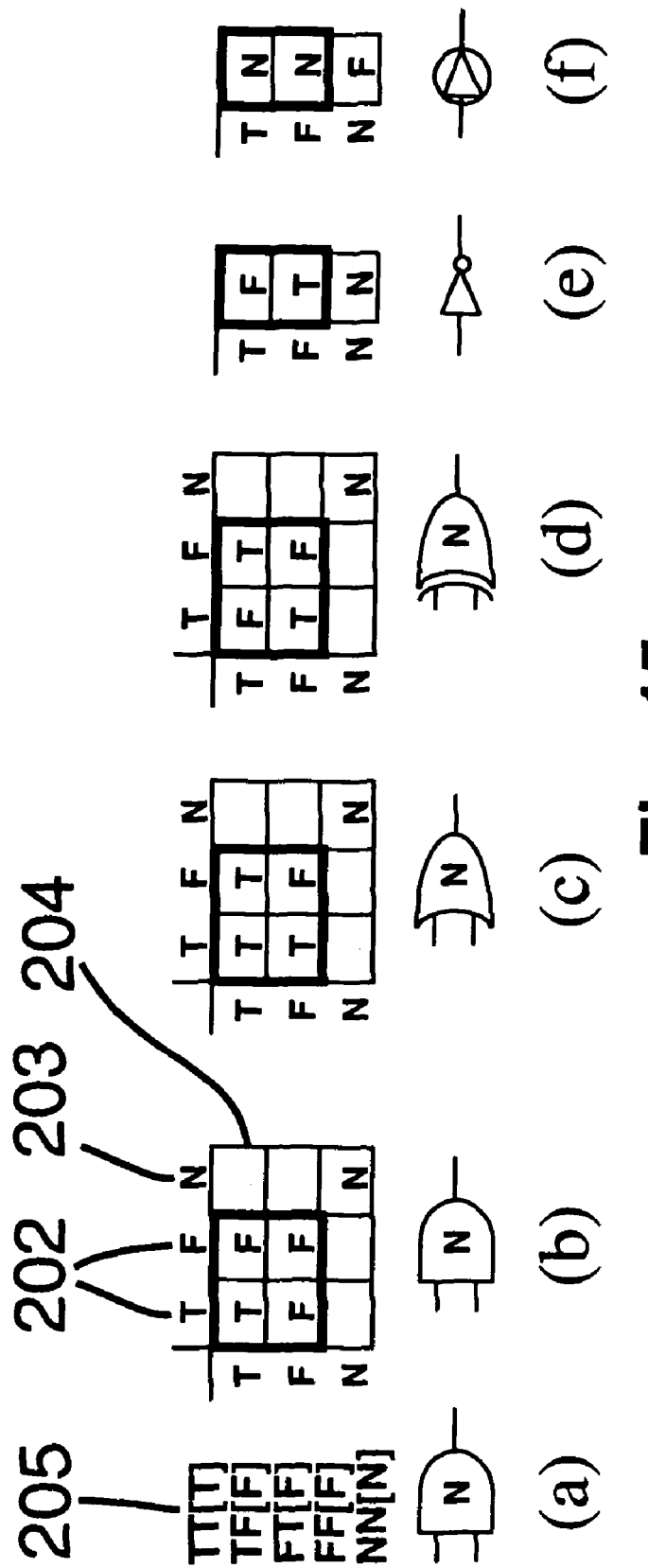
FIG. 15 illustrates Boolean operators enhanced with the NULL.

FIG. 15 shows Boolean operators enhanced with the NULL convention to appreciate the completeness of presented inputs. Each operator behavior is shown as a function table. The set of value transform rules is shown as well for the AND operator. T and F 202 are the content data values, and N 203 is the content NULL value. A dash 204 in the table indicates that the output does not transition. The set of value transform rule definitions is also shown for the AND operator 205. Notice that a dash indicates the absence of a value transform rule for the formed name. In that circumstance, the operator output does not change. The absence of a change for those states must be added for a complete statement of the operator behavior.

Each operator expresses the completeness criterion for both data content and NULL content. The operator transitions to N only when the input is completely N, and the operator transitions to T or F only when all the inputs of the operator are T or F. The operator transitions to a correct result of the input only when the input is completely NULL or completely data, thus expressing the completeness criterion.

4.5.1 Composing the Completeness Criterion

Figure 16:
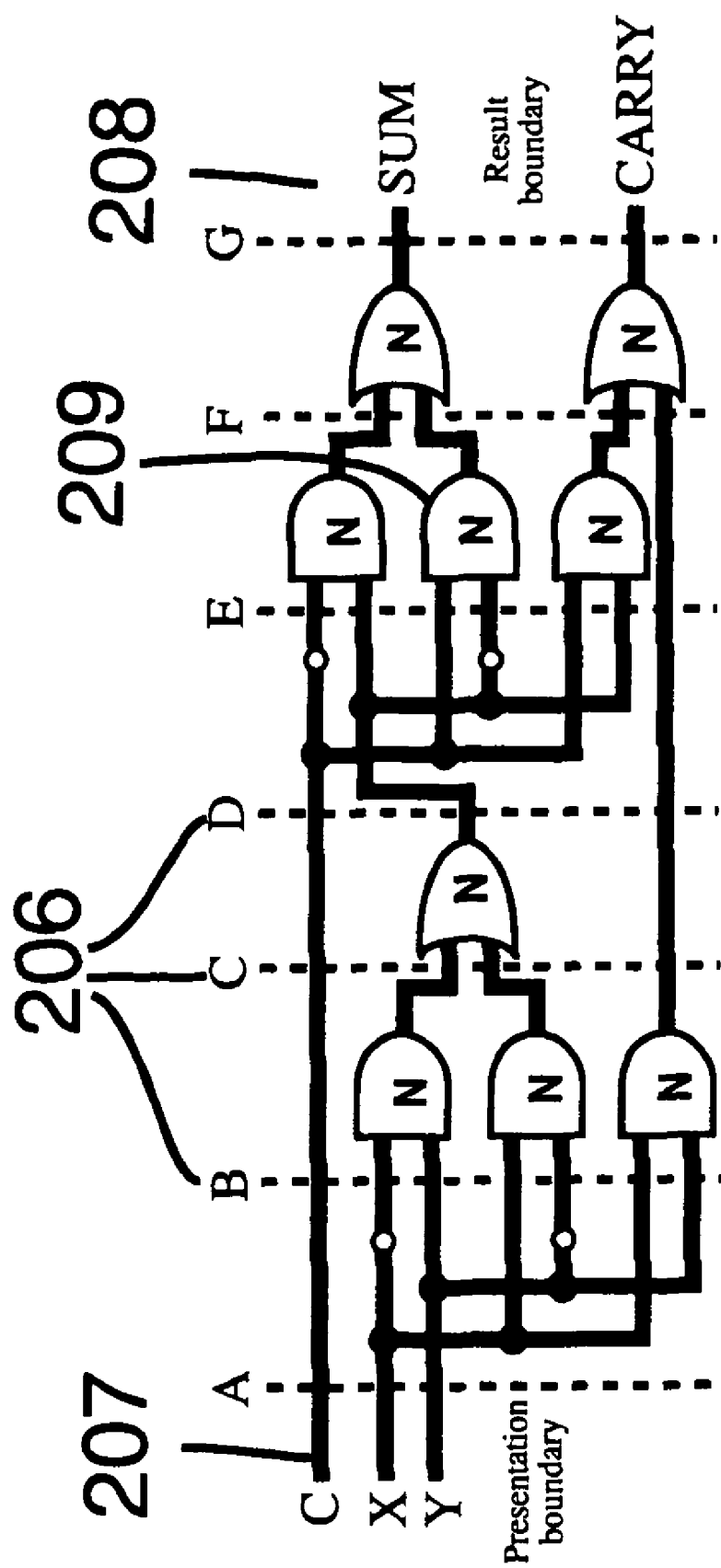
FIG. 16 illustrates a Boolean full-adder expression.

Consider the Boolean full-adder expression of FIG. 16. It is a structure of acyclic association relationships among Boolean operators. Divide any such association structure arbitrarily into N ranks of operators ordered progressively from input to output 206, with all inputs before the first rank 207 and all outputs after the last rank 208. It does not matter what rank an operator falls into. The rank boundaries are shown with vertical lines labeled alphabetically in rank order from input to output.

For all the values crossing boundary G to be data, all of the values crossing F must be data.

For all the values crossing F to be data, all of the values crossing E must be data.

For all the values crossing E to be data, all of the values crossing D must be data.

For all the values crossing D to be data, all of the values crossing C must be data.

For all the values crossing C to be data, all of the values crossing B must be data.

For all the values crossing B to be data, all of the values crossing A must be data.

Therefore, for all the values at G to be data, all the values at A must be data.

These considerations are also true for a NULL input presented when the expression is in an all data state. Simply substitute NULL for data in the above text.

During passage of a data wavefront, content transitions monotonically from empty (all NULL) to full (all non-NULL) as resolution progresses through the expression from input to output. If any value crossing a boundary is NULL, then there will be at least one NULL value crossing all boundaries to the right of that boundary. There can only be a complete data content at the output when there is a complete data content at the input and the content has propagated through the expression. The output can only be completely NULL when the input is completely NULL and the NULL has propagated through the expression. The expression as a whole expresses the completeness criterion by virtue of its individual components each expressing the completeness criterion.

The behavior of a wavefront propagating through the expression is completely determined by the behaviors of the component operators. Consider the middle operator of the rank between E and F 209. It does not matter in what order data values arrive or how long the data values (NULL values) take to propagate through other operators and over association paths to the input of this operator; it will not output data (NULL) until all values are data (NULL) at the input of the invocation. There are no races, no hazards and no chatter or other spurious result values during the propagation of a wavefront. By virtue of its completeness behavior, each operator coordinates the orderly propagation of monotonic transitions to correct result values through the expression until the output of the expression as a whole is the complete and correct resolution of the input.

4.5.2 Coordinating Completeness Boundaries

Figure 17:
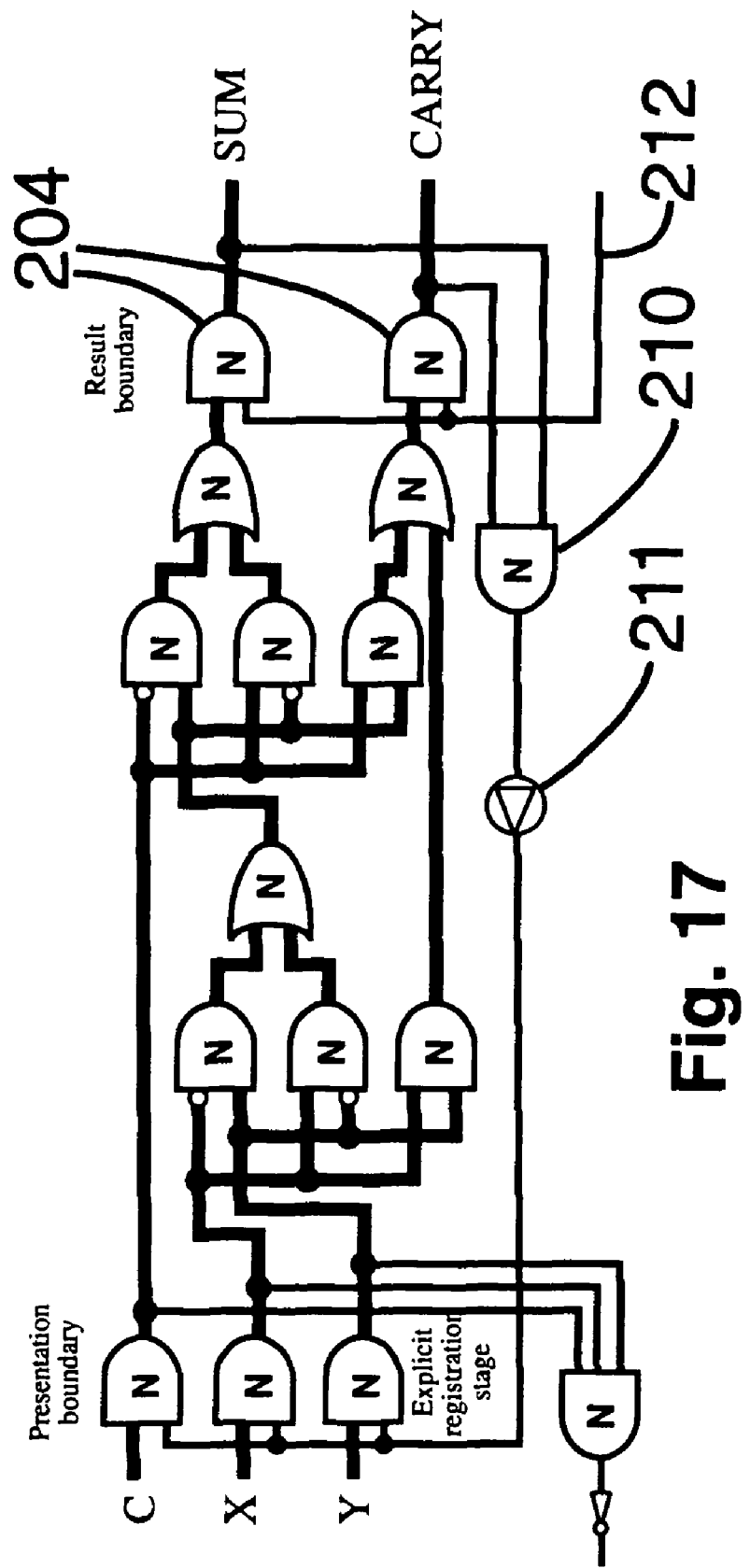
FIG. 17 illustrates a coordination protocol modeled on the ring oscillator protocol of FIG. 11.

An expression manifesting the completeness criterion will exhibit binary completeness behavior at its input and output data path boundaries. This binary behavior of the data path can express send "content" and send "welcome" and can participate directly in a coordination protocol. FIG. 17 shows a coordination protocol modeled on the ring oscillator protocol of FIG. 11 added to the full-adder expression. Beginning in an all NULL state with a data content presented to the input, the data content will begin propagating through the expression. When both the sum and carry outputs are data, the completeness will be appreciated by the AND gate 210. The appreciation will be domain inverted 211 (shown also in FIG. 15F), and "thanks" will be sent to the upstream presenter of the input. In this instance, the "thanks" serves as a request for a NULL content. When the NULL content arrives, the propagation of the NULL content itself serves as the "welcome". When the output is all NULL, it may be assumed that (i) all the inputs are NULL, (ii) the NULL has propagated through the expression, (iii) all the component operations are reset to empty, and (iv) the expression as a whole is empty and ready to receive the next data content. The AND gates 204 will maintain the last result as long as the acknowledge received on acknowledge line 212 from the successor expression is DATA. Upon completeness of NULL at the output and a "request for NULL from the successor expression on acknowledge line 212, the NULL will be allowed through gates 204, and a "request" will be sent for the next data content.

The completeness of the output implies the completeness of the input and the propagation of completeness through the expression. The input content is maintained at the input while propagating through the expression until the result is maintained by the output and "thanks" is received from the output of the expression.

Figure 18:
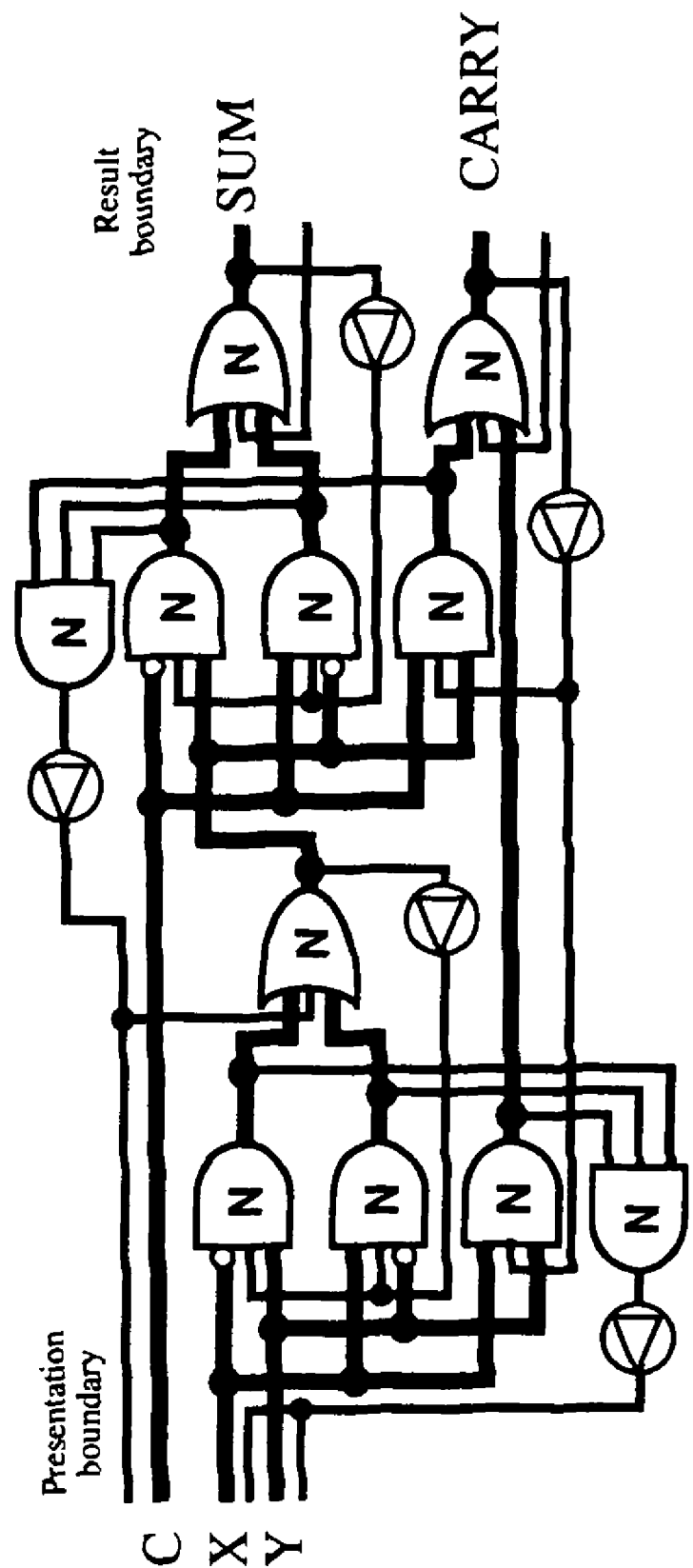
FIG. 18 illustrates a full adder with coordination protocol at the operator level.

The relation of the completeness of the output to the completeness of the input does not need to be coincident. Just as the fact of completeness of the input propagates stage by stage through the structure of association relationships, it can also pipeline stage by stage. The input and the output boundaries of each operator form completeness boundaries that, themselves, can participate in a coordination protocol. FIG. 18 shows the full adder with coordination protocol at the operator level in effect pipelining the full adder.

As a data content presented at the input flows into the structure, it can be followed immediately by a NULL content. That can be followed immediately by another data content, and so on alternately ad infinitum. When the resolution flow of a particular presented data input reaches the output, that input no longer need be presented to the input of the full-adder. But the completeness status of that input is still embodied in the content being presented to the last stage of the full adder. When the output asserts the results, they are the correct results of a completely presented data content that has propagated through the expression, even though the data content is no longer presented at the input of the full adder.

4.5.3 Content Fan-Out and Completeness of "Thanks" and "Request".

Figure 20:
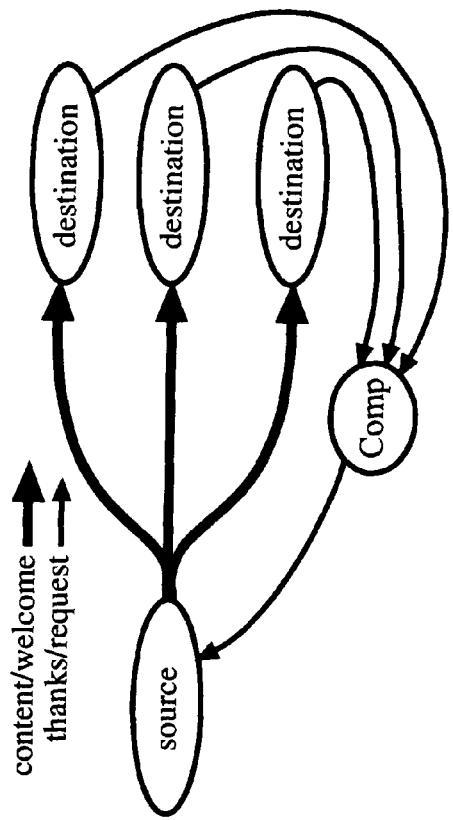
FIG. 20 illustrates an external completeness operation determining completeness and passing to a source place a single "request"/"thanks" which embodies the completeness of "request"/"thanks"
Figure 19:
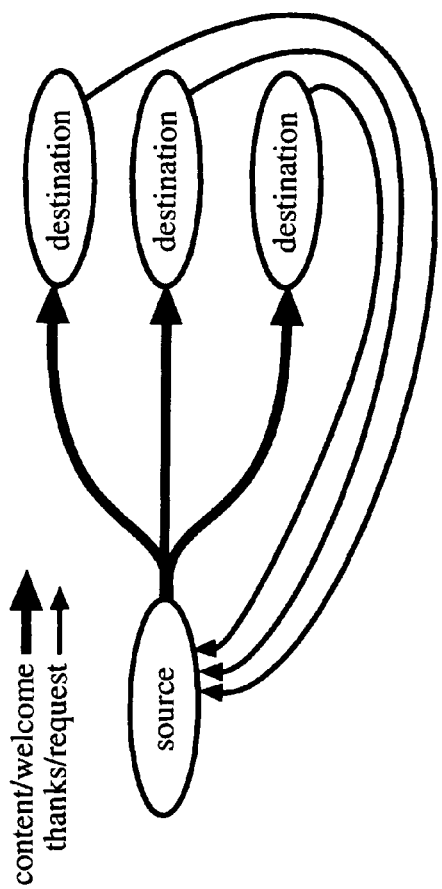
FIG. 19 illustrates a source place receiving a "request"/"thanks" directly and determining the completeness of reception.

A source place can associate with and send content to many destination places. Destination places send "request" and "thanks", and the source place ensures that all the "requests" and "thanks" are received (complete) before sending "content" or "welcome". Fan-out of content then involves a corresponding fan-in of "request"/"thanks". A source place can receive the "request"/"thanks" directly and determine the completeness of reception as in FIG. 19. Alternately, an external completeness operation can determine the completeness and pass to the source place a single "request"/"thanks" which embodies the completeness of "request"/"thanks" as in FIG. 20.

4.5.4 Content Fan-In Completeness

A destination place typically associates with a single source place. Content fan-in is expressed as the formation of a name with the association of multiple destination places in a multi-element destination list of an invocation. The completeness relationship of a fan-in is the completeness of the formation of the name in the destination list. Fan-in is complete for a particular expression when all names of the destination list are formed with content.

4.6 The Invocation and Completeness of Name Formation

An invocation establishes an association between its destination list and its source list, as discussed above. The destination list of an invocation and the source list of its definition together define a set of input flow places. Similarly, the destination list of the definition and the source list of the invocation together form a set of output flow places as in FIG. 2b. The expression in the resolution place of the definition expresses how the contents of the input flow places propagate to the output flow places.

Figure 21:
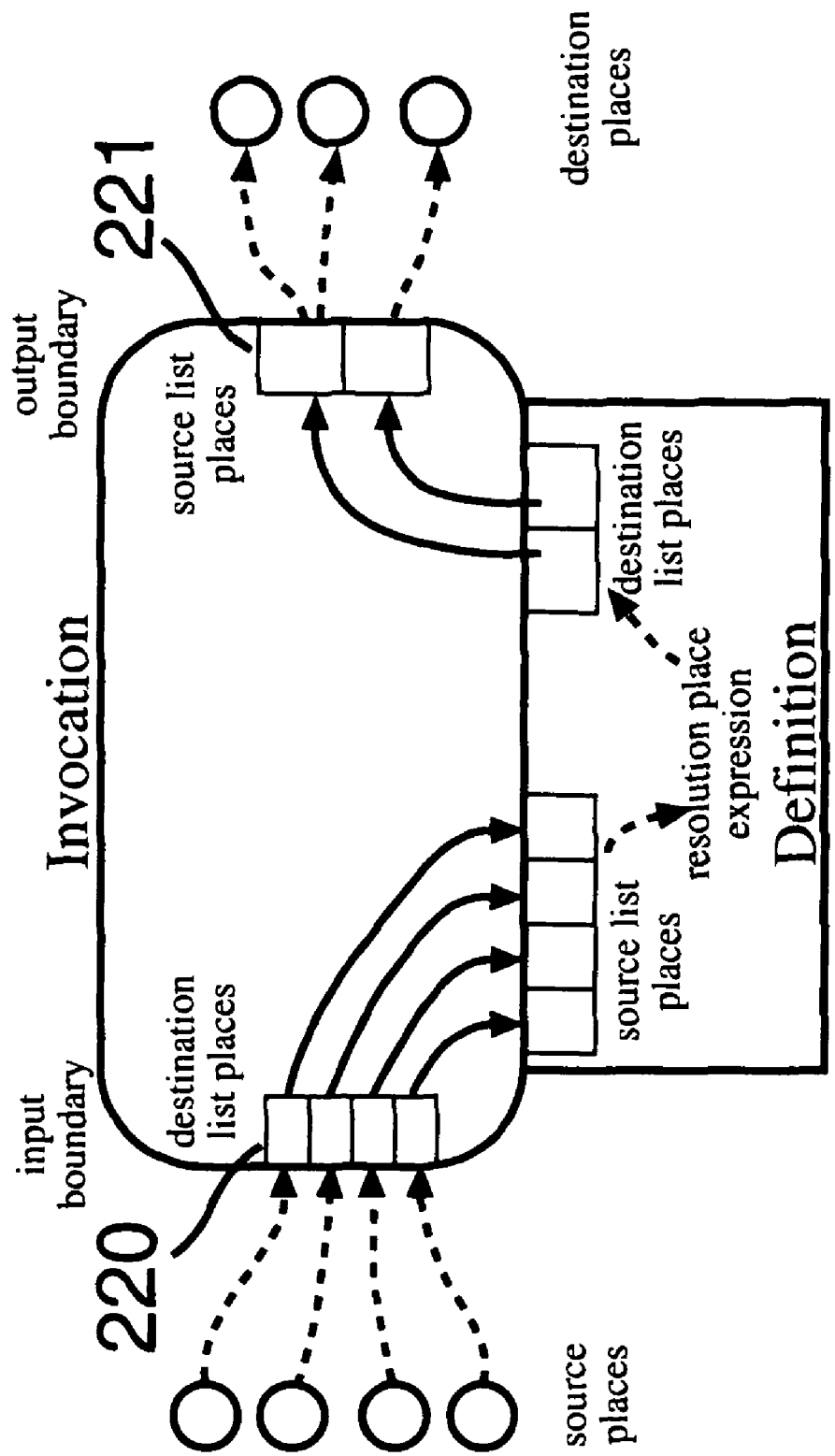
FIG. 21 illustrates a conceptual association structure of an invocation.

FIG. 21 illustrates a conceptual association structure of an invocation. The input destination places 220 and output source places 221 bound the formation of a name and its resolution. The content flowing to the destination places is a complete and correct resolution of a completely-formed input name. The invocation expresses the completeness criterion from its input boundary to its output boundary: from its destination list to its source list. The completeness of the content flow through the fan-in association of the input flow places is appreciated by the completeness of the content of the output flow places.

An invocation expresses the completeness criterion by virtue of all the invocations contained in its definition resolution expression. Each definition resolution expression expresses completeness criterion until value transform rules are invoked. Each value transform rule expresses a completeness criterion because its resolution expression is a single constant. The appearance of a result implies the complete formation of the value transform name.

Each invocation is a bounded unit of resolution behavior whose boundaries are also candidate coordination boundaries.

4.7 Completeness Relationships that Vary

As seen above, the invocation language expresses the essential criteria of completeness, though it need not express the detail of coordination, deferring it as a universal convention. There are circumstances where completeness relations can vary from presentation to presentation. Completeness does not always mean that every place in the destination list of an invocation is full. What constitutes completeness of the destination list is determined by the propagation of the content of the input and the completeness of the output. When the output is complete the resolution is complete. Completeness of the output implies completeness of the input.

4.7.1 Completeness of Name Formation

The language expresses the completeness relation of the fan-in association of the destination list of an invocation. But completeness can take varying forms depending on the process. One completeness characteristic is that all the places in the destination list must be full. In addition, there may be additional expressions of variable completeness relations: convention, arbitration and specification. Each is discussed below in more detail.

4.7.2 The Convention Structure

In the convention structure there is a convention embodied in the definition about the criterion of completeness, such as, for instance, that completeness comprises exactly one destination place of a list of destination places being full. The convention structure is a way of appreciating completeness when a process potentially receives multiple groups of inputs (or generates multiple groups of outputs), but only one input (or output) from each group is necessary for completeness. A source list or destination list may be written as a list delimited by braces, with each pair of braces encompassing one or more place names. Each brace pair corresponds to one input (output) group. The list will be complete when exactly one place in each group (i.e., between each bracket pair) has become full. Typically, the remaining places remain empty. All the places will be associated to the resolving expression, which resolves to completeness with exactly one content from each delimited set. This accommodates one-of-N or multi-rail forms of expression.

Table 10 illustrates an expression using convention variable completeness. It expresses what can be considered a dual rail encoded OR function as described. For each presentation, the content of each place will be either the data value D or it will be empty. The resolution expression is four invocations. Each invocation name is formed from as a constant symbol string and destination places. Only one invocation name will completely form and invoke a definition when there is exactly one content from each brace list. The definition places a source place with content D associated to one of the two places in the destination list. The assertion of the output implies the completeness of the input fulfilling the completeness criterion.

TABLE 10

| | |
|---|---|
| inv | ABC({$place1 $place2}{$place3 $place4})({OUT1< > OUT2< >}) |
| def | ABC[{A< > B< >}{C< > D< >}]({$OUT1 $OUT2}) |
| | ONE$A$C( ) |
| | TWO$A$D( ) |
| | THREE$B$C( ) |
| | FOUR$B$D( ) : |
| |     ONEDD[OUT1< D >] |
| |     TWODD[OUT2< D >] |
| |     THREEDD[OUT2< D >] |
| |     FOURDD[OUT2< D >] |
| ] | |

4.7.3 The Arbitration Structure

The arbitration structure is another way appreciating completeness when a process potentially receives a group of inputs (or generates a group of outputs), and no more than one may be accepted (or generated) at a time. A source list or destination list is written as a uniquely named list (such as "ARB") delimited by braces, with the pair of braces encompassing the place names. The list will be complete when any one or more places between each bracket pair has become full. The arbitration structure expresses arbitration of content flow. Arbitration expresses that, of the places in the brace list which may all be full of content for any presentation, only one content will flow to the definition source list. If there is a conflict, the contents will compete to flow. The precise rule is not critical, as long as it is deterministic. For example, if two inputs arrive simultaneously, the left most of the list may be accepted first. Any contents that are full and do not flow will remain full and participate in the next presentation.

The arbitration structure is a named pair of braces. In the invocation destination list, the name does not associate, but only indicates that the structure is an arbitration structure. The multiple destination places in the invocation destination list appear as a single place in the definition source list. In the definition the structure is a named pair of empty braces. It represents a single source place with a content that associates to destination places in the resolution expression.

Figure 22:
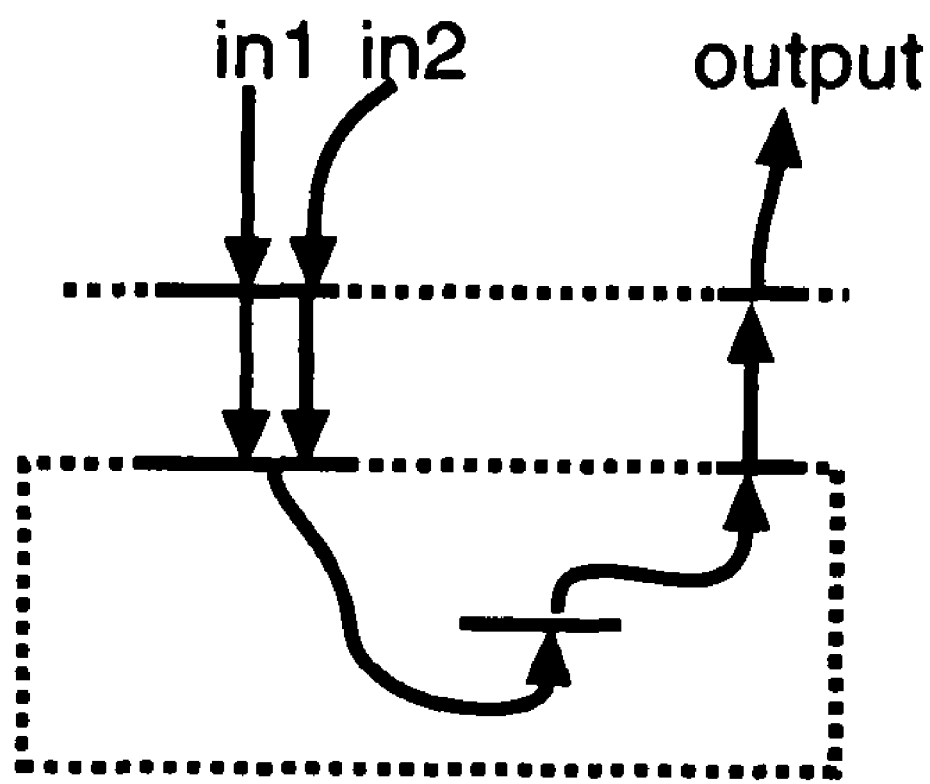
FIG. 22 illustrates an association structure of an arbitrated fan-in expression.

Table 11 shows an arbitrated fan-in expression which allows only one content per presentation of multiple presented contents to flow. Of the contents of place1 and place2, only one content at a time will flow to next. The association structure of the expression is shown in FIG. 22.

TABLE 11

| | |
|---|---|
| inv | Arbiter(arb{$place1 $place2})(next< >) ..... $next |
| def | Arbiter[(placeB{ })($pass) pass<$placeB> : ] |

4.7.4 The Specification Structure

In the specification structure, one destination place contains a specification name that selects one or more destination places from multiple candidate places in the destination list. One place in a list immediately preceding the braces determines the completeness relations of the places in the list delimited by the braces. The specifying place (preceding the braces) must always be complete with each presentation. The content of this place determines the completeness relation for the places delimited by the braces. The specification content forms the name of an invocation which will invoke a definition. The definition returns a resolution expression that determines completeness by its association relations to the source places in the brace list. Each different invocation associates with a different set of source places in the brace list. When this expression generates a complete result, the completeness of the input is implied.

4.7.4.1 Fan-In Completeness Specification

Figure 23:
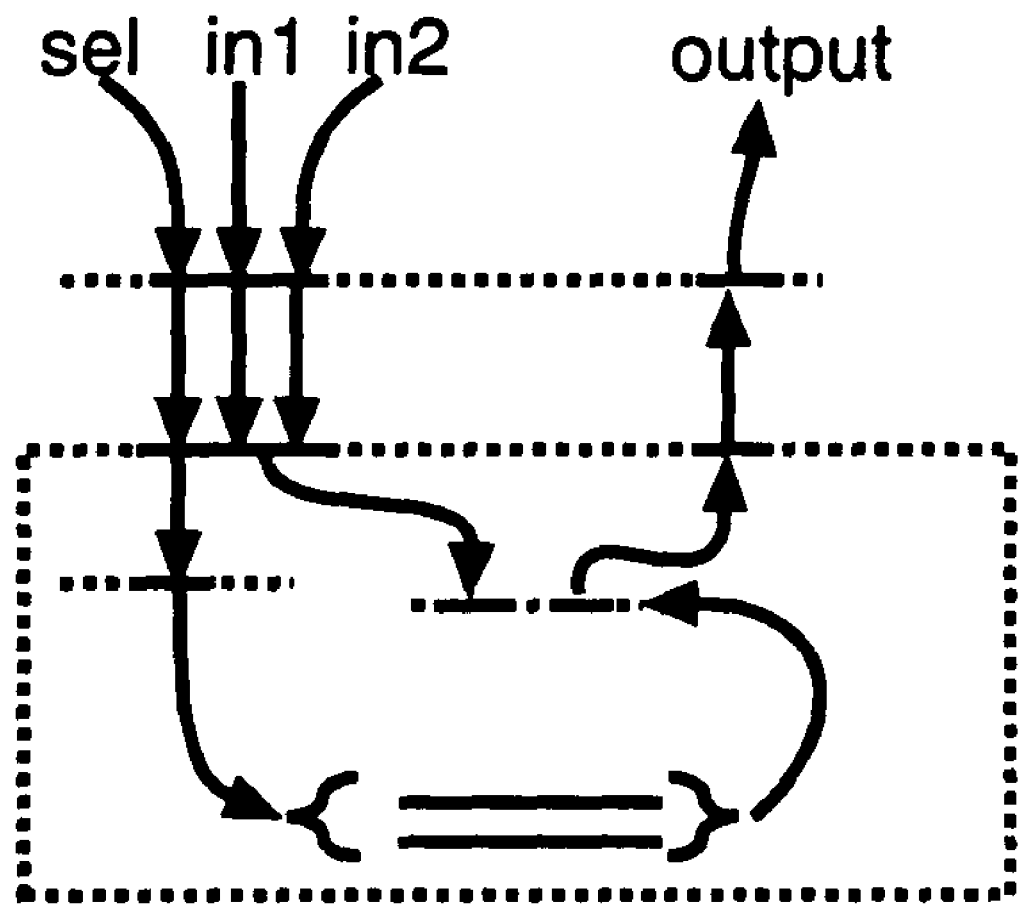
FIG. 23 illustrates an association structure of a specified fan-in expression.

Table 12 shows an expression of a specified fan-in. The specifier is "selin." The content of "selin", which can be A or B, determines which of "in1" or "in2" will comprise completeness. The content of the selected places will flow into the resolution expression emptying the source place in the definition source list. The source places in the source list not selected to may or may not be full. If a source place is full and not selected, its content will be retained until a presentation occurs that does select it. The association structure of the expression is shown in FIG. 23.

TABLE 12

| | |
|---|---|
| inv | fanin($selin{$in1 $in2})(output< >) .... output |
| def | fanin[(selin< >{in1< > in2< >})($out) |
| |   $selin( ) : |
| |     A[out<$in1( )>] |
| |     B[out<$in2( )>] |

4.7.4.2 Fan-out Completeness Specification

Figure 24:
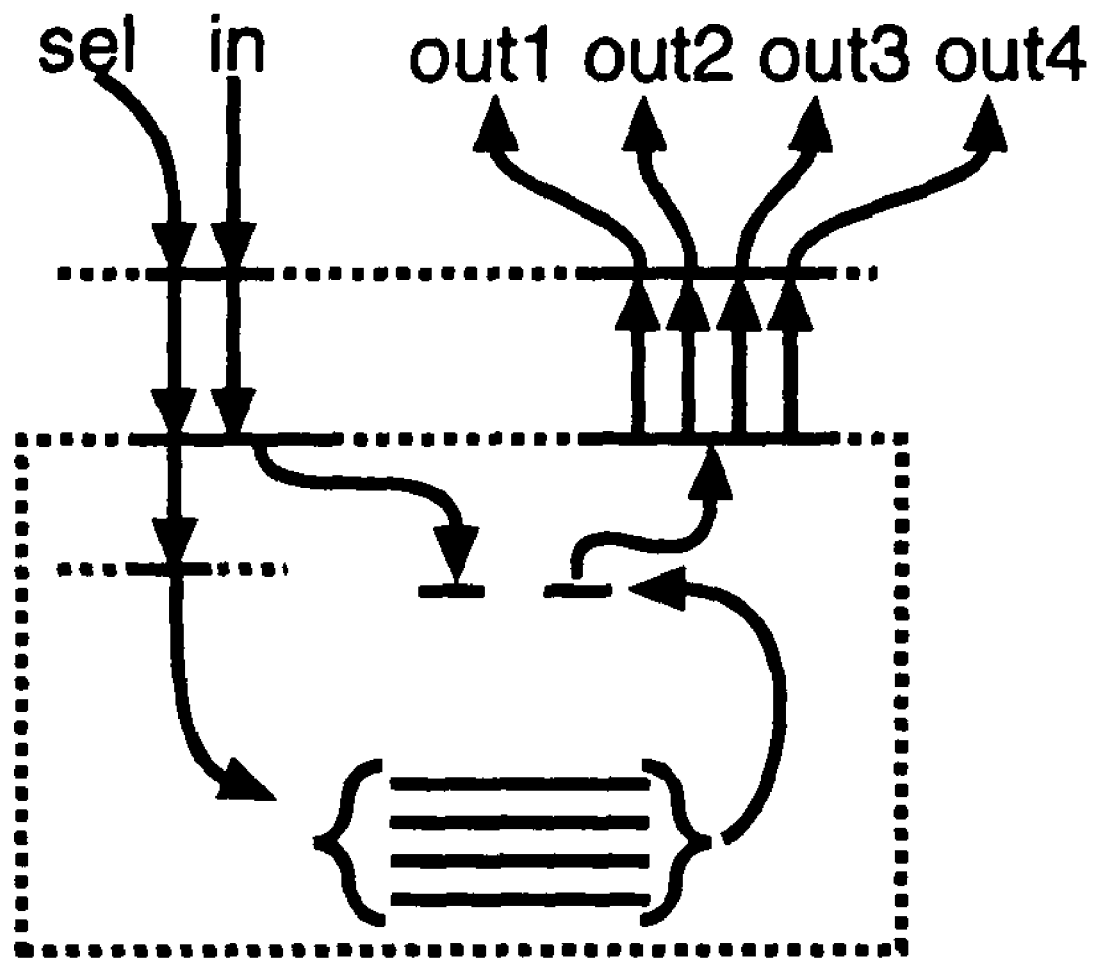
FIG. 24 illustrates an association structure of a fan-out expression.

Table 13 shows a fan-out association from one source to multiple destinations. It can be a distribution to all destinations, which is expressed by a source-to-destination fan-out association. Alternately, there can be a select name that determines the associations for each specific instance. The selected association is expressed as a definition. The association structure of the fan-out expression is shown in FIG. 24.

TABLE 13

| | |
|---|---|
| inv | fanout($selout $serialmid)({out1< > out2< > out3< > out4< >}Q) |
| def | fanout[(selout< > content< >)($selout{$out1 $out2 $out3 $out4}) |
| |   $selout( ) :   A[out1<$content( )>] |
| |     B[out2<$content( )>] |
| |     C[out3<$content( )>] |
| |     D[out4<$content( )>] |
| ] | |

4.7.4.3 Serial Bus: Fan-in/Fan-out Expression

Table 14 is a serial bus expressed by associating the output of a fan-in with the input of a fan-out.

TABLE 14

| | |
|---|---|
| inv | fanin($selin{$in1 $in2})(serialmid< >) |
| inv | fanout($selout $serialmid)({out1< > out2< > out3< > out4< >}) |

4.8 Parallel Bus: Fan-Out/Fan-In Expression

Table 15 is a parallel bus expressed by associating the output of multiple fan-outs with the inputs of multiple fan-ins. The outAs and outBs of the fan-out invocations associate to the inputs of the fan-in invocations.

TABLE 15

| | |
|---|---|
| inv | fanout($seloutA $srcA)({outA1< > outA2< > outA3< > outA4< > outA5< >}) |
| inv | fanout($seloutB $srcB)({outB1< > outB2< > outB3< > outB4< > outB5< >}) |
| inv | fanin($selin1 {$outA1 $outB1})(dest1< >) |
| inv | fanin($selin2 {$outA2 $outB2})(dest2< >) |
| inv | fanin($selin3 {$outA3 $outB3})(dest3< >) |
| inv | fanin($selin4 {$outA4 $outB4})(dest4< >) |
| inv | fanin($selin5 {$outA5 $outB5})(dest5< >) |

4.9 ALU: A More Complex Completeness

Table 16 shows the expression of an arithmetic logic unit ("ALU"). The completeness of both input and output depends on the content of the command place, which can be shiftl, shiftr, NOT, AND, OR, XOR or ADD. The contents of command forms the name of an invocation which invokes a definition. The definition places a resolution expression in the resolution place. The resolution place associates with source places in the bracketed source list of the definition. Some resolutions associate with one place. Others associate with two places. ADD associates with all three places.

TABLE 16

```
inv   ALU($command {$A $B $carryin})(output< >carryout< >)
def   ALU[(command< >{A< > B< > carryin< >})
          ($command{$result $carryout})
      $command( ) :
          shiftl[SL($A)(result< >)]
          shiftr[SR($A)(result< >)]
          NOT[N($A)(result< >)]
          AND[A($A $B)(result< >)]
          OR[(O($A $B)(result< >)]
          XOR[X($A $B)(result< >) ]
          ADD[AD($A $B $carryin)(result< > carryout< >)]
          SL[($A)(result< >) ... : ... ]
          SR[($A)(result< >) ... : ... ]
          N[($A)(result< >) ... : ... ]
          A[($A $B)(result< >) ... : ... ]
          O[($A $B)(result< >) ... : ... ]
          X[($A $B)(result< >) ... : ... ]
          AD[($A $B $carryin)(result< > carryout< >) ... : ... ]
]
```

Figure 25:
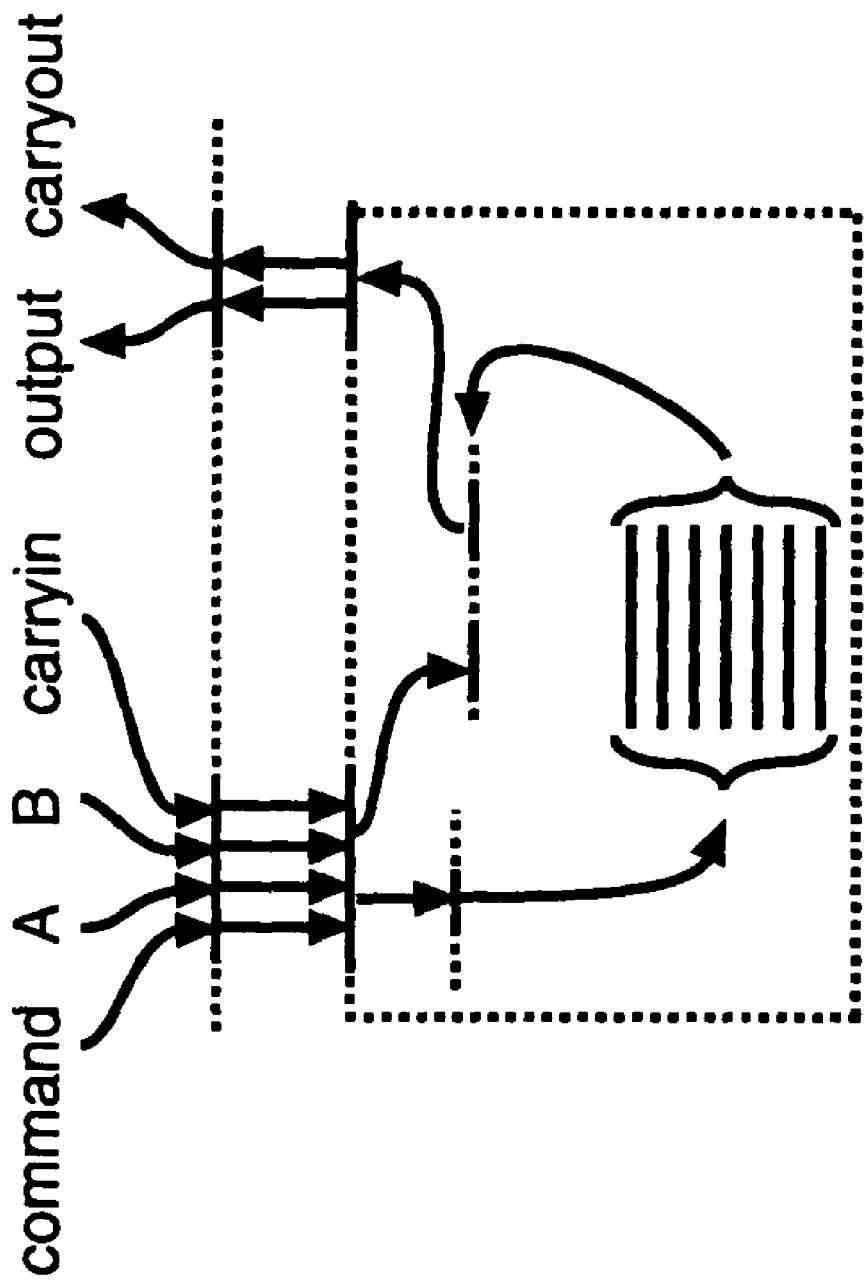
FIG. 25 illustrates an association structure of an ALU expression.

The association structure of the ALU expression is shown in FIG. 25.

4.10 Summary of Coordination

The coordination protocols and the completeness criterion together provide orderly behavior of resolution flow through a structure of association relationships. While the coordination behavior is somewhat involved and there are many ways to express coordination behavior at many different abstract levels from low level signal protocols to high level message passing protocols, it can be easily conventionalized by specifying the general behaviors of coordination. Once conventionalized, the mechanisms of coordination need not be explicitly expressed in the language, but can be deferred as a universal convention. The language can assume that effective coordination will be added to the structure of association relationships in the process of enlivening an expression.

An appropriate granularity of coordination and the specific expressions of coordination appropriate for various levels of granularity can be determined for various target enlivening environments at the time of enlivenment. (An enlivening environment may be software simulator, if the language is implemented as a simulation, or a translator or computer if the languages is implemented for translation or compilation.) An invocation expression can be mapped to a fully instantiated, spontaneously behaving pipeline structure or partitioned into diverse enlivenment environments including strict sequencing of the most primitive operations in a conventional single processor or multi processor computer.

5. A Progression of Examples

Figure 26:
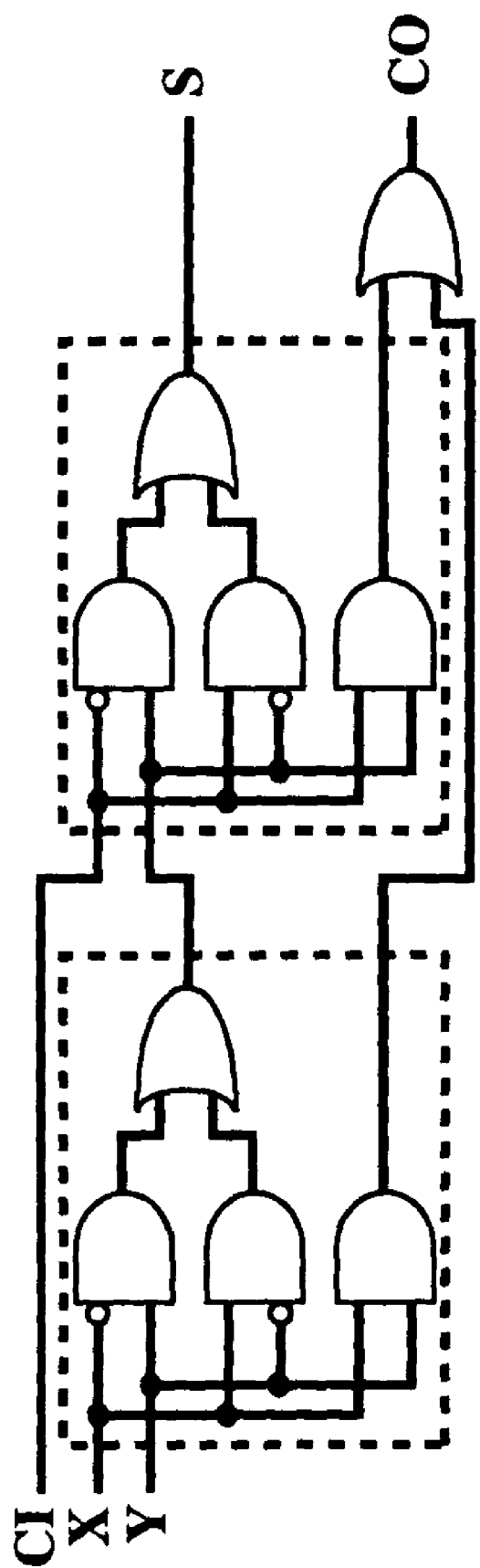
FIG. 26 illustrates graphical expression of a binary full adder composed of two Boolean half-adders.

Binary digit addition will serve as the initial example process being a binary full adder composed of two Boolean half-adders shown as a graphical expression in FIG. 26. The expression is a structure of association relationships among Boolean functions. Each function defers what its presented input value will be by associating its input to another place in the structure—either the output of another gate or the input of the expression which defers beyond the expression. This structure of association relationships looked at from right to left is a structure of deferment pathways. Looked at from left to right, it is a structure of fulfillment pathways. Looked at in terms of coordination, it can be seen as a structure of completeness boundaries, with the boundaries being the input and output of the expression and the input and output of each function.

Table 17 is a symbol string expression of the Boolean full-adder of FIG. 26. The expression in the resolution place of the definition (beginning with "FIRSTSUM" and ending with a colon) expresses the identical association relationships that the graphic circuit does. The FIRSTSUM source place represents the output of the first half-adder and is fanned out to three destination places. SUM and CARRY are the results of the expression and are associated with the destination place in the destination list of the definition.

TABLE 17

```
inv   FULLADD(0, 1, 0)(< > CARRYOUT< >) ... $CARRYOUT
def   FULLADD[(X< >Y< >C< >)( $SUM $CARRY)
          FIRSTSUM<OR(AND(NOT($X),$Y),AND($X,NOT($Y)))>
          CARRY<OR(AND($X,$Y),AND($C,$FIRSTSUM)>
          SUM<OR(AND(NOT($C),$FIRSTSUM),AND($C,NOT($FIRSTSUM)))> :
          OR[(A< >B< >)($res) res<$A$B( )> :
          0[0] 1[1] 00[0] 01[1] 10[1] 11[1] ]
          AND[(A< >B< >)($res) res<$A$B( )> :
          0[0] 1[0] 00[0] 01[0] 10[0] 11[1] ]
          NOT[(A< >)($res) res<$A( )> :1[0] 0[1]
      ]
```

The association relationships among gates of the combinational circuit that do not fan-out are expressed by syntactic nesting. The invocations do not have source lists. Their results are delivered to the place of the invocation, which is a place in the destination list of another invocation. Most of the association relationships among gates are expressed as syntactic nesting relationships.

Notice that while the graphic expression implies the functionality of AND, OR and NOT, the symbol string expression is complete in itself. That is, the meaning of the symbols for the gates are defined by convention elsewhere. The primitive functions AND, OR and NOT are defined in the contained definition place of the FULLADD definition.

Note that the first source place of the source list of the invocation (preceding "CARRYOUT<>") is unnamed. The $SUM result of the definition, which associates by syntax correspondence to the unnamed sourceplace, will be associated to the place of the invocation.

The CARRY sourceplace ("CARRY<OR . . . >") associates by name correspondence to $CARRY in the definition destination list, which in turn associates by syntax correspondence to CARRYOUT< > in the invocation source list. Ultimately, it associates to other destinations outside the FULLADD invocation by name correspondence to $CARRYOUT.

5.1 No Nesting

Expressing association relationships with syntactic nesting may be useful as a human convenience, but it is neither a necessary nor a sufficient form if expression in a symbol string. It is not sufficient in that it cannot directly express circular or feedback relationships, and it cannot directly express fan-out relationships. It is not necessary in that all relationships that can be expressed in terms of nesting can be expressed in terms of name correspondence.

Figure 27:
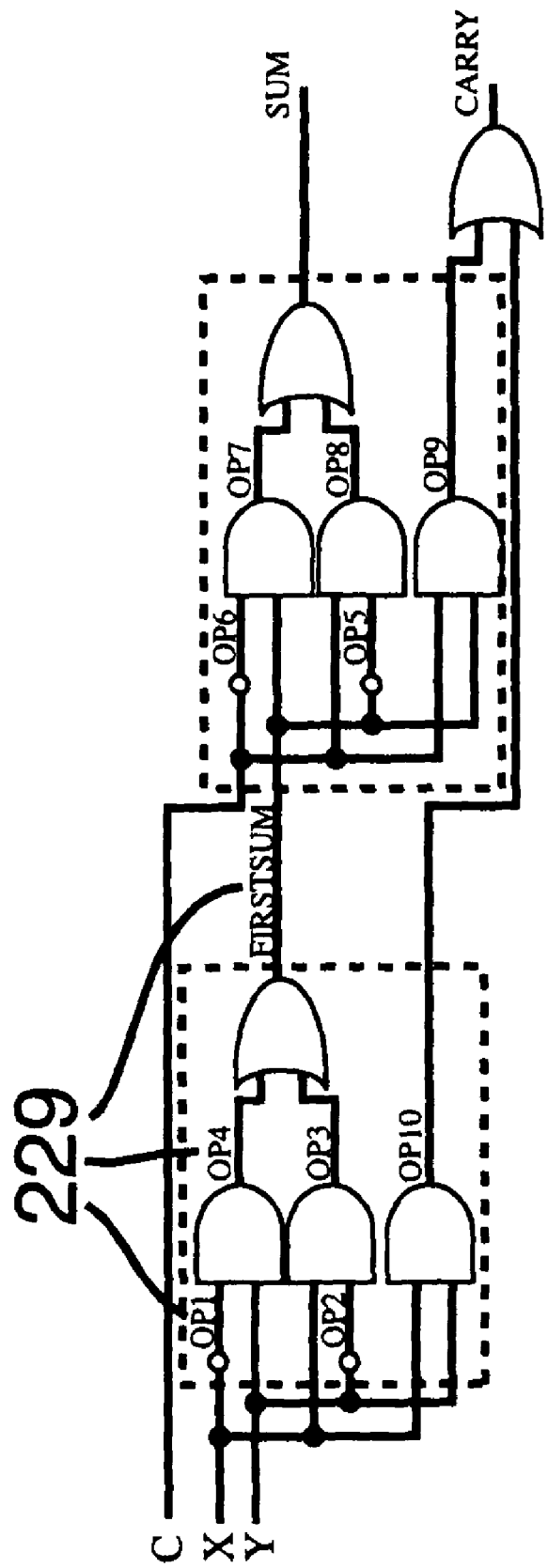
FIG. 27 illustrates a graphic expression labeled with correspondence names 229 source places.

FIG. 27 shows the graphic expression labeled with correspondence names 229 for each source place. Table 18 illustrates the full-adder expressing the same association relationships as the graphic circuit completely in terms of name correspondence relationships. It is a netlist for the full-adder circuit. There is no invocation nesting in the expression.

TABLE 18

```
inv  FULLADD(0, 1, 0)(< > CARRYOUT< >) ... $CARRYOUT
def  FULLADD[(X< >Y< >C< >)( $SUM $CARRY)
       NOT($X)(OP1< >)
       AND($OP1 $Y)(OP4 < >)
       NOT($Y)(OP2< >)
       AND($X $OP2)(OP3< >)
       OR($OP4 $OP3)(FIRSTSUM< >)
       NOT($FIRSTSUM)(OP6< >)
       AND($C $OP6)(OP7< >)
       NOT($C)(OP5< >)
       AND($OP5 $FIRSTSUM)(OP8< >)
       OR($OP7 $OP8)(SUM< >)
       AND($X $Y)(OP10< >)
       AND($C $FIRSTSUM)(OP9< >)
       OR($OP10 $OP9)(CARRY< >)
          OR[(A< > B< >)($res) res<$A$B( )>
             :00[0] 01[1] 10[1] 11[1] ]
          AND[(A< > B< >)($res) res<$A$B( )>
             :00[0] 01[0] 10[0] 11[1] ]
          NOT[(A< >)($res) res<$A( )> :1[0] 0[1] ]
     ]
```

5.2 Larger Value Transform Rule Names

The examples of Table 17 and Table 18 resolve a three value name in terms of a progression of resolutions of two value names. The example of Table 19 shows the FULLADD expression that can directly resolve the three value name in terms of value transform rule definitions with three value names. With longer value transform rule names there is less association structure.

TABLE 19

```
inv  FULLADD(0, 1, 0)(< > CARRYOUT< >) ... $CARRYOUT
def  FULLADD[(A< >B< >C< >)( $SUM $CARRY)
       CARRY<COUT($A $B $C)(< >)>
       SUM<ADD($A $B $C)(< >)> :
         COUT[(X< > Y< > Z< >)($res) res<$X$Y$Z( ) > : 000[0] 001[0] 010[0] 011[1]
             100[0] 101[1] 110[1] 111[1] ]
         ADD[(X< > Y< > Z< >)($res) res<$X$Y$Z( )> : 000[0] 001[1] 010[1] 011[0]
             100[1] 101[0] 110[0] 111[1]] ]
```

There are two invocations and two contained definitions. Each definition uses a different set of value transform rules with the same set of names. Each set of value transform rules has to be isolated within a definition to avoid name ambiguity. The value transform rule names are unique only within the isolated scope of each definition.

The value transform rule names can be made unique in a larger scope of reference by appending a unique constant part to the name. If the names are unique in a larger scope of reference, then the isolating definitions are not needed. The example of Table 20 shows the full-adder with value transform rule names made unique with a unique constant part. The definitions of COUT and ADD are no longer needed.

TABLE 20

```
inv  FULLADD(0, 1, 0)(< > CARRYOUT< >) ... $CARRYOUT
def  FULLADD[(A< >B< >C< >)( $SUM $CARRY)
       CARRY<COUT$A$B$C( )>
       SUM<ADD$A$B$C( )>
          COUT000[0] COUT001[0] COUT010[0] COUT011[1]
          COUT100[0] COUT101[1] COUT110[1] COUT111[1] ]
          ADD000[0] ADD001[1] ADD010[1] ADD011[0]
          ADD100[1] ADD101[0] ADD110[0] ADD111[1] ]
```

More can be added to the constant part of the name to make it unique in an even broader scope of reference. In the example of Table 21, FULLADD has been added to the value transform rule names to make the names unique in a broader scope of reference. The FULLADD definition itself is now not needed.

TABLE 21

```
source places        A<1>    ...   B<0>   ...   C<1>
invs   FULLADDADD$A $B $C( )   ...   FULLADDCOUT$A $B $C( )   ...
defs   FULLADDCOUT000[0] FULLADDCOUT001[0]
defs   FULLADDCOUT010[0] FULLADDCOUT011[1]
defs   FULLADDCOUT100[0] FULLADDCOUT101[1]
defs   FULLADDCOUT110[1] FULLADDCOUT111[1] ]
defs   FULLADDADD000[0] FULLADDADD001[1]
defs   FULLADDADD010[1] FULLADDADD011[0]
defs   FULLADDADD100[1] FULLADDADD101[0]
defs   FULLADDADD110[0] FULLADDADD111[1] ]
```

5.3 The Set of Name Forming Symbols

Name forming symbols, disjoint from the syntax symbols, are used to form correspondence names as well as content names. Name correspondence relies only on name equality. It is insensitive to the symbol set used. Corresponding names for invocations and definitions can be expressed using any set of conveniently available symbols. Even a single symbol can be used, in which case names will correspond solely by their length.

Correspondence names and content names are syntactically isolated. Content flows through the associations until the content symbols start forming names of value transform rules and become correspondence names. Ultimately, all content symbols participate in forming names of invocations that associate with value transform rules at the most primitive level of resolution. Consequently the value transform rule definitions determine the set of content symbols. There need not be any reserved or pre-assigned names.

In the examples above the correspondence names were formed with a full alphabet and the content names were formed with the symbols 0 and 1. The example of Table 22 shows an expression of the full adder using just two name forming symbols: 0 and 1. The structure of the expression is identical to the example of Table 19.

TABLE 22

| | |
|---|---|
| inv | 1011001101(0,1, 0)(< > 101010101< >)   $101010101 |
| def | 1011001101[(1100< >1101< >1110< >)($11010 $111111111) |
| | 111111111< 11110000($1100 $1101 $1110)(< >)> |
| | 11010<11001100($1100 $1101 $1110)(< >)> |
| | 11110000[(11100< >11101< > 11110< >)($10111) |
| | 10111<$11100 $11101 $11110( )>: |
| | 000[0] 001[0] 010[0] 011[1] 100[0] 101[1] 110[1] 111[1] ] |
| | 11001100[(11100< >11101< > 11110< >)($10111) |
| | 10111<$11100 $11101 $11110( )>: |
| | 000[0] 001[1] 010[1] 011[0] 100[1] 101[0] 110[0] 111[1] ] ] |

5.4 A Pure Value Expression

Figure 28:
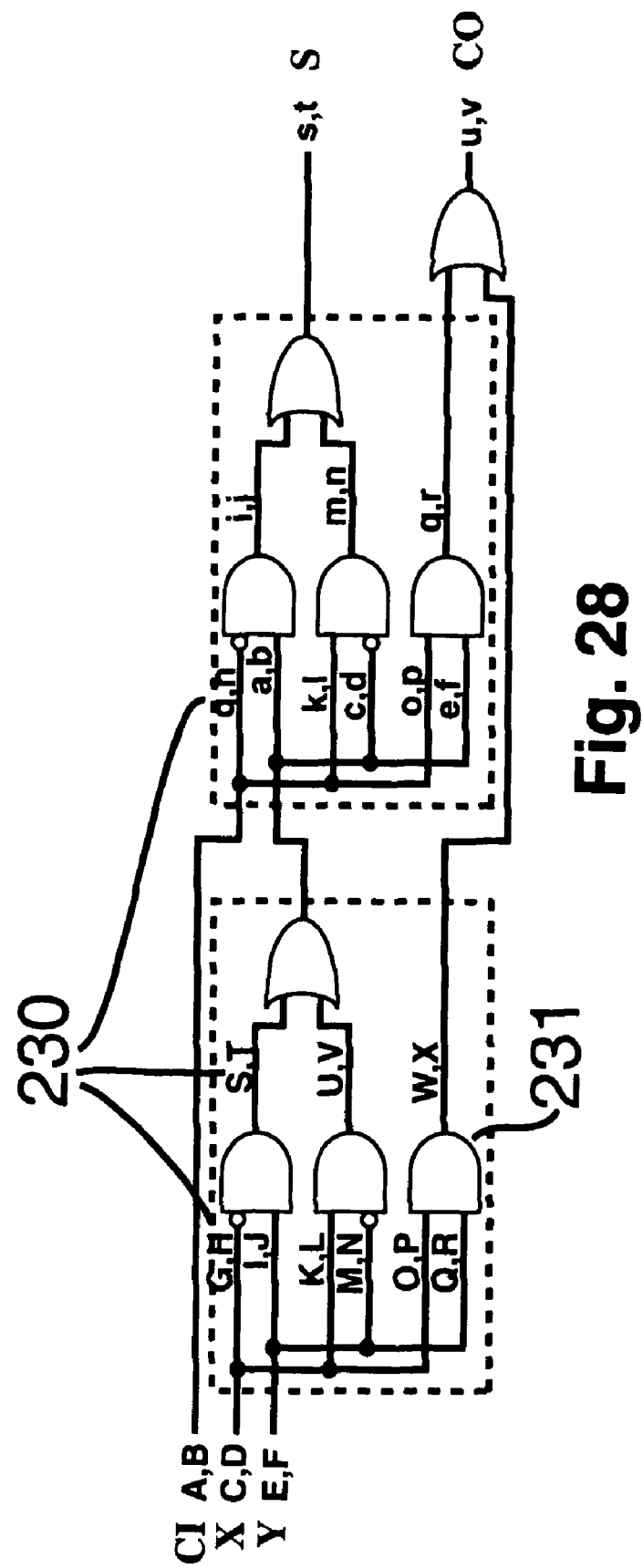
FIG. 28 illustrates association paths mapped into two unique symbols, one representing a 0 symbol on a wire and one representing a 1 symbol on a wire.

The binary full adder can be mapped into a pure value expression that is expressed solely in terms of unique symbols and value transform rules. A pure value expression is one whose meaning is independent of location. The Boolean logic expression uses two unique symbols, 0 and 1, and unique places within the expression to represent unique differentnesses within the expression. The 0 or 1 on a first path has a different meaning from the 0 or 1 on a different path. In FIG. 28 each association path is mapped into two unique symbols 230; one representing a 0 symbol on the wire and one representing a 1 symbol on the wire.

C means X=0

D means X=1

E means Y=0

F means Y=1 and so on for each path in the circuit.

Figure 29:
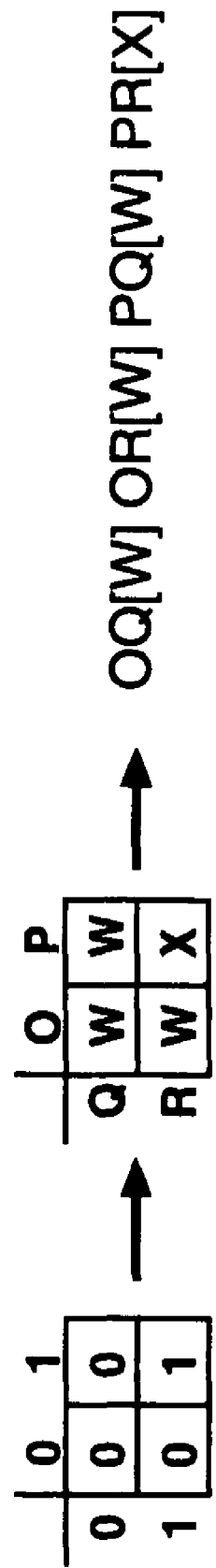
FIG. 29 illustrates a derivation of value transform rules for a gate.

The value transform rules for resolving each formed name are derived from the symbols associated with each gate. The derivation of the value transform rules for the gate surrounded by O, P, Q, R, W and X 231 is shown in FIG. 29. The set of derived value transform rules then becomes the set of contained definitions. The resulting expression is shown in Table 23.

TABLE 23

| | |
|---|---|
| inv | FULLADD($A,$B,$C)(< > CARRYOUT< >) |
| def | FULLADD[(X< >Y< >C< >)( $SUM $CARRY) |
| | $X $Y $C: |
| | "fan-out input symbols" |
| | A[g,k,o] B[h,l,p] C[G,K,O] D[H,L,P] E[I,M,Q] F[J,N,R] |
| | "define combinational resolution stages" |
| | GI[S] GJ[T] HI[S] HJ[S] |
| | KM[U] KN[U] LM[V] LN[U] |
| | OQ[W] OR[W] PQ[W] PR[X] |
| | SU[a,c,e] SV[b,d,f] TU[b,d,f] TV[b,d,f] "fan out input to second half-adder" |
| | ga[i] gb[j] ha[i] hb[i] |
| | kc[m] kd[m] lc[n] ld[m] |
| | oe[q] of[q] pe[q] pf[r] |
| | im[SUMMAND< s >] in[SUM< t >] jm[SUM< t >] |
| | jn[SUM< t >] "sum" |
| | qW[CARRYOUT< u >] qX[CARRYOUT< v >] |
| | rW[CARRYOUT< v >] rX[CARRYOUT< v >] "carry out" |
| | ] |

The expression in the place of resolution contains no parenthesis, so it represents a pure value expression in which the values spontaneously associate to form names of value transform rules.

Figure 30:
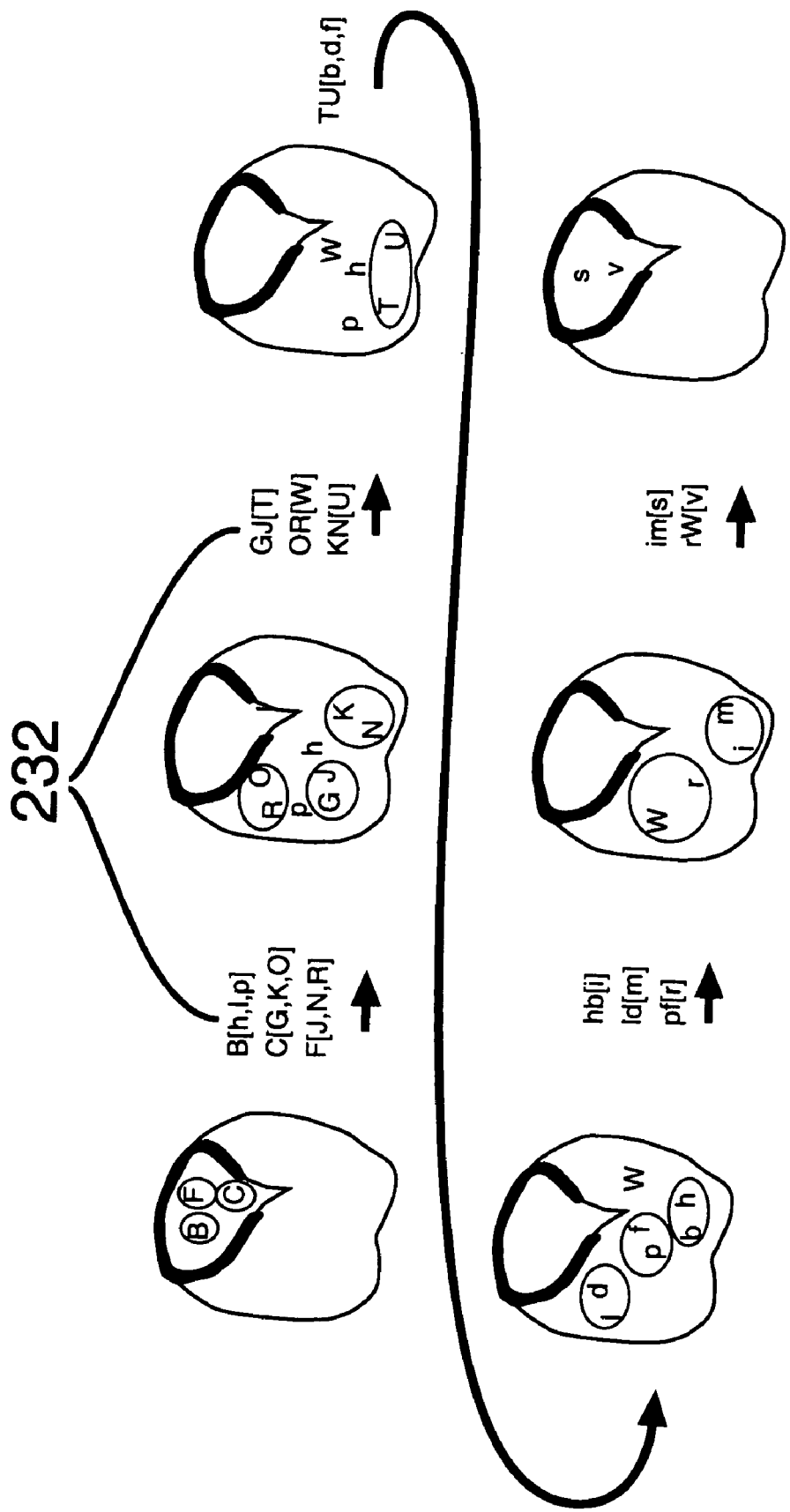
FIG. 30 illustrates a progression of resolution for input values as a progression of populations of symbols in a shaking bag.

FIG. 30 shows the progression of resolution for input values B, C and F as a progression of populations of symbols in a shaking bag. In each population of values, only certain associations form a value transform rule. The values that form the name of a value transform rule are shown circled. The value transform rules involved in each population are shown above the arrows 232 and assert the values that will be in the succeeding population.

The population of values at each stage of resolution is unique. There is no ambiguity of association or interaction at any stage of the resolution. The spontaneous individual behavior of indiscriminately associating values reliably and unambiguously resolves to a correct result.

5.5 Conditional Iteration: Greatest Common Divisor (GCD)

Figure 31:
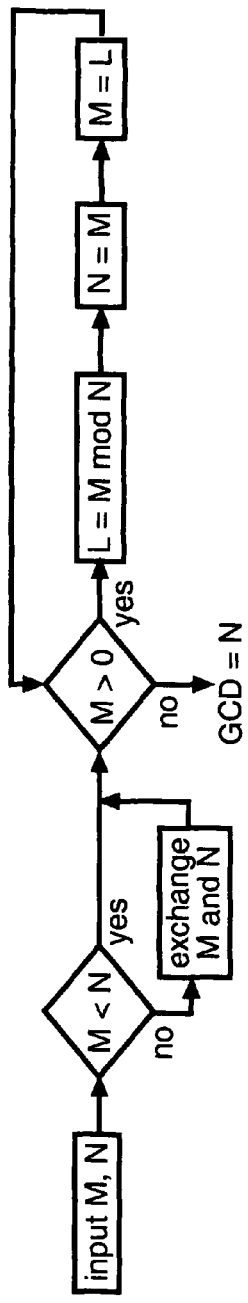
FIG. 31 illustrates the greatest common divisor algorithm of Euclid as an illustration of conditional iteration in the language.

The greatest common divisor algorithm of Euclid, shown in the flowchart of FIG. 31, will illustrate conditional iteration in the language. The algorithm generates intermediate values until M is equal to 0, at which point N is equal to the greatest common divisor of the input M and N. Table 24 is the invocation expression of the greatest common divisor algorithm. The association relationships form a ring that the content flows around until the termination state is reached. N is passed on as the GCD and a new pair of numbers is requested.

TABLE 24

| | |
|---|---|
| inv | GCD($M $N)( GCD< >) |
| def | GCD[(M< >N< >)( $GCD) |
| | LTsteer($M,$N)(inlesser< > ingreater< >) |
| | dualfanin($condition $inlesser $ingreater $remainder $cyclelesser) |
| | (lesser< > greater< >) |
| | Mod($cyclelesser $cyclegreater)(remainder< >) |
| | EQ0($lesser)(condition< True > ) |
| | dualfanout($condition $Modlesser $Modgreater) |
| | (cyclelesser< > cyclegreater< >SINK< > GCD< >) |
| | dualfanin[(steer< >{A< > B< > C< > D< >})($out1 $out2) |
| | $steer( ):   True[out1< $A > out2< $B >] |
| | False[out1< $C > out2 < $D >]] |
| | dualfanout[(steer< > A< > B< >)(($steer){$out1 $out2 $out3 $out4}) |
| | $steer( ):   True[out1< $A > out2< $B >] |
| | False[ out3< $B > out4< $A >]] |
| | EQ0[(A< >)($condition) |
| | condition<Equal($A,0 )>: ] |
| | LTsteer[(A< >B< >)($out1 $out2) |
| | LT($A $B) :   True[out1< $A > out2< $B > |
| | False[out1< $B > out2< $A >]] |
| | ] |

Figure 32:
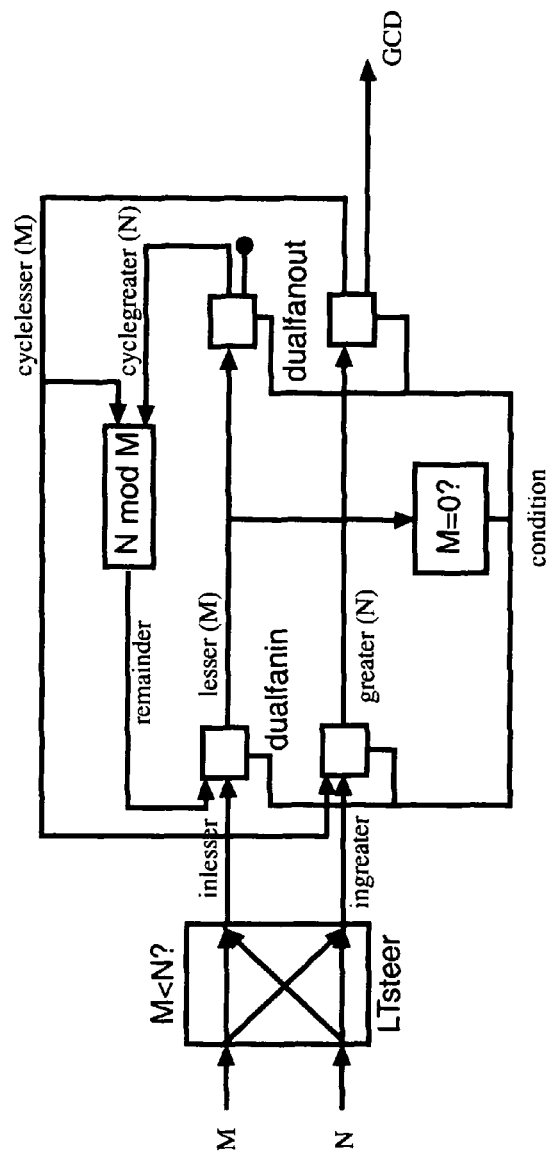
FIG. 32 illustrates an association structure of an invocation expression.

FIG. 32 shows the association structure of the invocation expression.

5.6 State Sequencer

Figure 33:
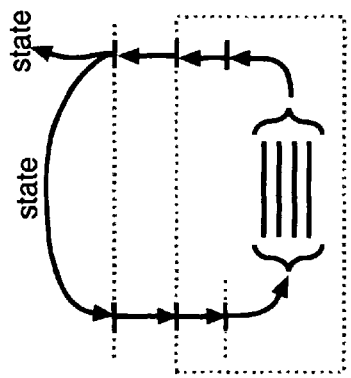
FIG. 33 illustrates an association structure of a state machine.

Table 25 is a simple state machine expression that continually rotates through four values. Each time it is invoked, it returns the next value. The state is maintained in the invocation itself in the feedback association from the source list to the destination list. The association structure of the state machine is shown in FIG. 33.

TABLE 25

| | |
|---|---|
| inv | fourstate($state)(state< 0 >) |
| def | fourstate[(curstate < >)($nextstate) |
| | nextstate <$curstate( )>   : |
| | 0[1] 1[2] 2[3] 3[0] ] |
| | ] |

The invocation maintaining the state can be inside the definition as in Table 26. In this case the invocation does not send the current state but just requests the next state. The state machine is a wavefront source producing a new wavefront of the next state value on request.

TABLE 26

```
inv   fourstate( )(state< 0 >)
def   fourstate[( )($nextstate)
             nextstate($state)(nextstate< 0 >) :
             nextstate[(curstate< >)($newstate)
             newstate<$curstate( )>
                    0[1] 1[2] 2[3] 3[0] ]
      ]
```

5.7 Code Detector

Figure 34:
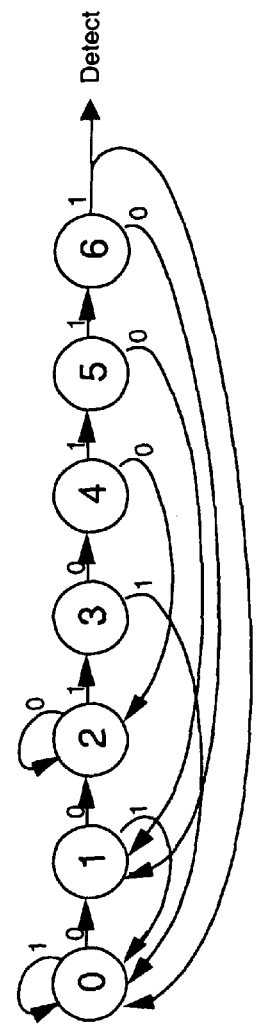
FIG. 34 illustrates a behavior of a state machine as a function table and as a state transition graph.

The code detector of Table 27 detects the occurrence of code sequence 0010111 in a continuous stream of bits. It is a state machine that cycles to a particular state if that indicates the sequence is detected. The invocation of code receives the current state and the next bit in the stream. Invoking the definition of code it receives the next state and the detect condition. The next state in the source list associates with current state in the destination list. When the next bit arrives code is invoked with the current state and the next bit. The behavior of the state machine is presented in FIG. 34 as a function table and as a state transition graph.

TABLE 27

```
inv   code($state $nextbit)(state< > detect< >)
def   code[(currentstate< > newbit< >)($state $detect)
            $newbit$currentstate( ) :
                 0S0[detect< no > state<S1>]
                 0S1[detect< no > state<S2>]
                 0S2[detect< no > state<S2>]
                 0S3[detect< no > state<S4>]
                 0S4[detect< no > state<S2>]
                 0S5[detect< no > state<S1>]
                 0S6[detect< no > state<S1>]
                 1S0[detect< no > state<S0>]
                 1S1[detect< no > state<S0>]
                 1S2["etect< no > state<S3>]
                 1S3[detect< no > state<S0>]
                 1S4[detect< no > state<S5>]
                 1S5[detect< no > state<S6>]
                 1S6[detect< yes > state<S0>] ]
```

5.7.1 Response Filter

The code detector always asserts a yes or a no for the detect condition. A response filter expression, shown in Table 28, can receive the detect condition and only pass on the yes condition. When the condition is no, an empty content is returned to the place of resolution and no result is passed on. When a yes is received, the yes is returned and passed on.

TABLE 28

```
inv   report($detect)(found< >)    .... $found
def   report[(detect< >)($detect{$found})
              $detect( ) :
                  yes[found<yes>]
                  no[ ]
              ]
```

5.8 LFSR

Figure 35:
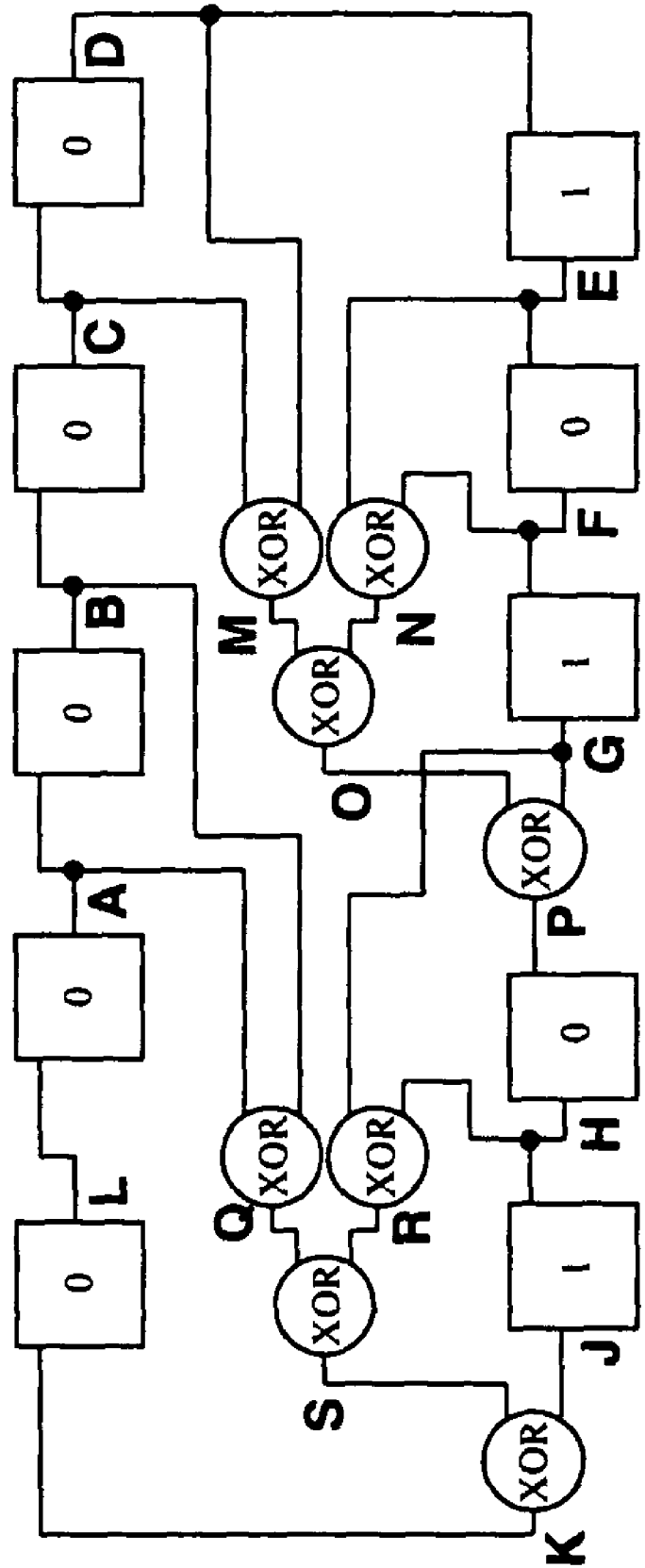
FIG. 35 illustrates a binary Linear Feedback Shift Register (LFSR) as a complex cyclic association structure of invocations of XORs and invocations of buffers.

The binary Linear Feedback Shift Register (LFSR) shown in FIG. 35 is a complex cyclic association structure of invocations of XORs and invocations of buffers. Each buffer is initialized with 0 or 1. The expression of the LFSR in Table 29 is the invocations with the source to destination association relationships. In the graphic expression the output of each function is named with a letter. In the string expression the output place in the source list of each invocation is named with the corresponding letter. Any number of invocations can associate with any output of the LFSR from anywhere in the greater expression. The example show three external invocations associating with the LFSR.

TABLE 29

```
invoc($K)(...) ...... invoc2($D)(...) ....... invoc3($F)(...)
XOR($C,$D)(M< >)
XOR($E,$F)(N< >)
XOR($M,$N)(O< >)
BUF($C)(D<0>)
BUF($D)(E<1>)
BUF($B)(C<0>)
BUF($E)(F<0>)
XOR($A,$B)(Q< >)
XOR($G,$H)(R< >)
XOR($Q,$R)(S< >)
BUF($L)(A<0>)
BUF($A)(B<0>)
BUF($F)(G<1>)
BUF($P)(H<0>)
XOR($O,$G)(P< >)
BUF($H)(J<1>)
XOR($S,$J)(K< >)
BUF ($K)(L<0>)
```

The LFSR could be isolated in a definition, but that would limit its accessibility. Buried in the midst of a large association structure, it could be difficult to discover the expression itself and to understand what the expression is doing. The LFSR is a wavefront source producing a steady stream of wavefronts to all associated destination places.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims

What is claimed is:

1. A method of performing a process expressed as computer program instructions recorded in a non-transitory machine-readable medium;
   (A) where the instructions have an internal structure characterized by:
      (a) a syntax delimiting places in a symbol string;
      (b) a convention associating delimited places in symbol strings;
      (c) a source place construct delimiting a place in a string for containing data;
      (d) a destination place construct delimiting a place in a string for receiving data;
      (e) an invocation construct instantiated as an invocation string having at least
         (i) an invocation destination list comprising a complete set of destination places for a process of identifies all inputs needed to carry out the process associated with a name of the instantiated invocation string, and
         (ii) an invocation source list comprising a complete set of source places for the process of identifies all inputs needed to carry out the process associated with the name of the instantiated invocation string identifies all values that result from the process invoked by the instantiated invocation string; and
(f) a definition construct instantiated as a definition string corresponding to the instantiated invocation string, said instantiated definition string comprising at least
(i) a definition source list of source places associated with the invocation destination list of the instantiated invocation string,
(ii) a definition destination list of destination places associated with the invocation source list of the instantiated invocation string; and
(iii) a resolution string defining resolution of the process by completely relating delimited places of the definition destination list with delimited places of the definition source list;
wherein completeness of input of the invocation destination list of the instantiated invocation is sufficient for resolving a process defined by the instantiated definition string; and
(B) wherein the method comprise:
(a) instantiating an operation of a first invocation string; and
(b) resolving the operation according to a definition string corresponding to the instantiated first invocation string.

2. The method of 1, wherein the instantiated definition string comprises a contained definition.

3. A method of regulating operation of a computer using computer program instructions conforming to a structure characterized by:
(a) an invocation string having
(i) a string identifying an operation,
(ii) an invocation destination list identifying, for each operand sourced externally to the invocation string, a place from which the operand is sourced, and
(iii) an invocation source list identifying a place for a result of the operation; and
(b) a definition string associated with the invocation string and having
(i) a resolution string defining the operation,
(ii) a definition destination list identifying, for each operand sourced external to the definition string, a place from which the operand is sourced, and
(iii) a definition source list identifying a place for a result of the operation; Where the method comprises:
(1) instantiating an operation of a first invocation string upon completeness of necessary operands identified by a invocation destination list of the first invocation string, where an element in a invocation destination list of a second invocation string identifies an element in a invocation source list of the first invocation string; and
(2) resolving the instantiated operation of the first invocation string according to a definition string associated with the first invocation string including a step of coordinating a content flow with an operation of the second invocation string that has a dependency relationship with the instantiated operation of the first invocation string.

4. The method of claim 3 where the definition source list has a one-to-one correspondence with the invocation destination list.

5. The method of claim 3 where the definition destination list has a one-to-one correspondence with the invocation source list.

6. The method of claim 3 where the definition string associated with the first invocation string includes a second definition string associated with an invocation string.

7. The method of claim 3 further includes a step of arbitrating sources for an invocation destination list.

8. The method of claim 3 where steps of the method are performed on a multi-processor computer.

9. The method of claim 3 where the step of instantiating an operation includes a step selected from the set of compiling, interpreting, and emulating.

10. The method of claim 3 where coordination includes an express signal of an availability to receive data.

11. The method of claim 3 where coordination is implicit in a presentation of data.

* * * * *